United States Patent
Wigren

(10) Patent No.: US 9,301,172 B2
(45) Date of Patent: *Mar. 29, 2016

(54) METHOD, APPARATUS, AND SYSTEM FOR INTERFERENCE AND NOISE ESTIMATION

(71) Applicant: Telefonaktiebolaget L M Ericsson (publ), Stockholm (SE)

(72) Inventor: Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 713 days.

This patent is subject to a terminal disclaimer.

(21) Appl. No.: 13/656,581

(22) Filed: Oct. 19, 2012

(65) Prior Publication Data

US 2014/0112164 A1 Apr. 24, 2014

(51) Int. Cl.
*H04W 24/08* (2009.01)
*H04W 28/02* (2009.01)
(Continued)

(52) U.S. Cl.
CPC .............. *H04W 24/08* (2013.01); *H04J 11/005* (2013.01); *H04L 5/0073* (2013.01); *H04W 28/0231* (2013.01); *H04W 72/08* (2013.01); *H04W 72/1252* (2013.01)

(58) Field of Classification Search
CPC . H04W 24/08; H04W 28/0231; H04W 72/08; H04W 72/1252; H04W 24/02
USPC .......................................................... 370/252
See application file for complete search history.

(56) References Cited

U.S. PATENT DOCUMENTS

| 7,912,461 | B2 | 3/2011 | Wigren |
| 2003/0206537 | A1 | 11/2003 | Choi et al. |

(Continued)

FOREIGN PATENT DOCUMENTS

| EP | 1 679 923 A1 | 7/2006 |
| EP | 1 727 388 B1 | 11/2006 |

(Continued)

OTHER PUBLICATIONS

International Search Report and Written Opinion mailed Jun. 26, 2014 in International Application No. PCT/SE2014/050203 (12 pages total).

(Continued)

*Primary Examiner* — Un C Cho
*Assistant Examiner* — Fangyan Deng
(74) *Attorney, Agent, or Firm* — Baker Botts, LLP

(57) ABSTRACT

Mobile broadband traffic has been exploding in wireless networks resulting in an increase of interferences and reduced operator control. Networks are also becoming more heterogeneous putting additional demand in interference management. Scheduler schedules uplink transmissions from UEs based on a load prediction algorithm that typically assumes worst case. However, UEs do not always use full power granted, and thus, much of granted radio resources are wasted. To address these and other issues, techniques to accurately predict/estimate other cell interferences and thermal noise separately and to accurately predict/estimate load utilization probabilities, rise-over-thermals, and load factor biases are described. The described techniques are applicable in a radio network node with any number of antenna branches. The techniques can be used to schedule UEs to more fully utilize available radio resources. Extended Kalman filtering can be adapted for use in estimation providing low order computational complexity.

23 Claims, 16 Drawing Sheets

(51) Int. Cl.
  *H04W 72/08* (2009.01)
  *H04W 72/12* (2009.01)
  *H04J 11/00* (2006.01)
  *H04L 5/00* (2006.01)

(56) References Cited

U.S. PATENT DOCUMENTS

| | | |
|---|---|---|
| 2003/0218974 A1 | 11/2003 | Zuniga |
| 2007/0177536 A1 | 8/2007 | Brueck et al. |
| 2011/0009070 A1 | 1/2011 | Wigren |
| 2011/0098014 A1 | 4/2011 | Martens et al. |
| 2012/0147828 A1* | 6/2012 | Wigren ............ 370/329 |
| 2012/0196589 A1 | 8/2012 | Wigren |
| 2013/0324175 A1* | 12/2013 | Wigren ............ 455/509 |

FOREIGN PATENT DOCUMENTS

| | | |
|---|---|---|
| WO | WO 03/005751 | 1/2003 |
| WO | 2007/024166 A1 | 3/2007 |
| WO | 2008/039123 A1 | 4/2008 |
| WO | 2011/071430 A1 | 6/2011 |
| WO | WO 2011/071430 | 6/2011 |
| WO | 2011/119075 A1 | 9/2011 |
| WO | 2013-043093 A1 | 3/2013 |

OTHER PUBLICATIONS

Inventor: Torbjörn Wigren, U.S. Appl. No. 13/853,369, filed Mar. 29, 2013, "Interference Estimation With TDM".
Inventor: Torbjörn Wigren, U.S. Appl. No. 13/776,328, filed Feb. 25, 2013, "Grant Utilization Based Other Cell Interference Estimation".
PCT Notification Concerning Transmittal of International Preliminary Report on Patentability (Chapter I of the Patent Cooperation Treaty) for International application No. PCT/SE2013/051178, Apr. 30, 2015.
PCT International Search Report for International application No. PCT/SE2013/051178, Mar. 5, 2014.
International Search Report and Written Opinion mailed May 22, 2014 in International Application No. PCT/SE2014/050078 (13 pages total).
Torbjörn Wigren et al., "Estimation of uplink WCDMA load in a single RBS", Sweden (5 pages).
Torbjörn Wigren, "Soft Uplink Load Estimation in WCDMA", IEEE Transactions on Vehicular Technology, vol. 58, No. 2, Feb. 2009, pp. 760-772.
Torbjörn Wigren, "Recursive Noise Floor Estimation in WCDMA", IEEE Transactions on Vehicular Technology, vol. 59, No. 5, Jun. 2010, pp. 2615-2620.
Inventor: Torbjörn Wigren, U.S. Appl. No. 13/488,187, filed Jun. 4, 2012, "Other Cell Interference Estimation".
International Search Report and Written Opinion mailed Jan. 27, 2014 in International Application No. PCT/SE2013/050643 (13 pages total).
Torbjörn Wigren, "Low Complexity Kalman Filtering for Inter-Cell Interference and Power Based Load Estimation in the WCDMA Uplink", Signal Processing and Communication Systems (ICSPCS), 2011 5th International Conference on, Dec. 2011 (10 pages).
Inventor: Torbjörn Wigren, U.S. Appl. No. 13/993,429, filed Jun. 12, 2013, "Radio Base Station and Method Therein".
International Search Report and Written Opinion with transmittal sheet dated Jan. 22, 2014 in International Application No. PCT/SE2013/050561 (12 pages total).
Kambiz Shoarinejad et al., "Integrated Predictive Power Control and Dynamic Channel Assignment in Mobile Radio Systems", IEEE Transactions on Wireless Communications, vol. 2, No. 5, Sep. 2003, pp. 976-988.

* cited by examiner

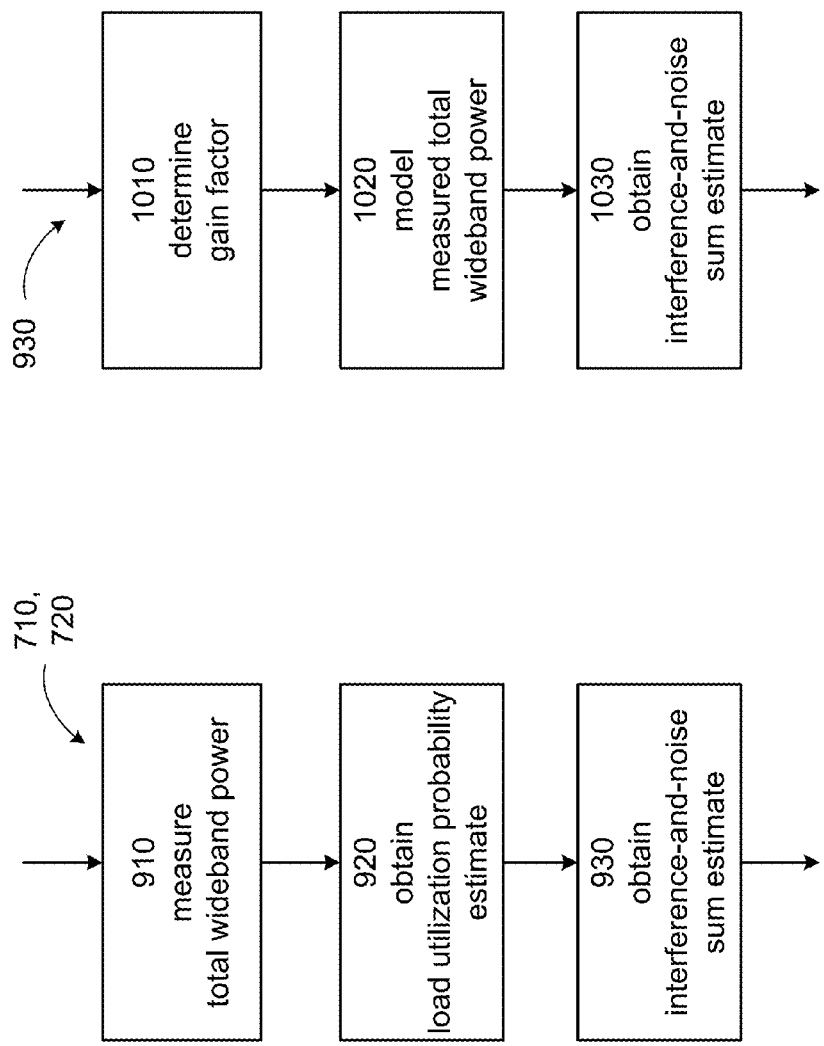

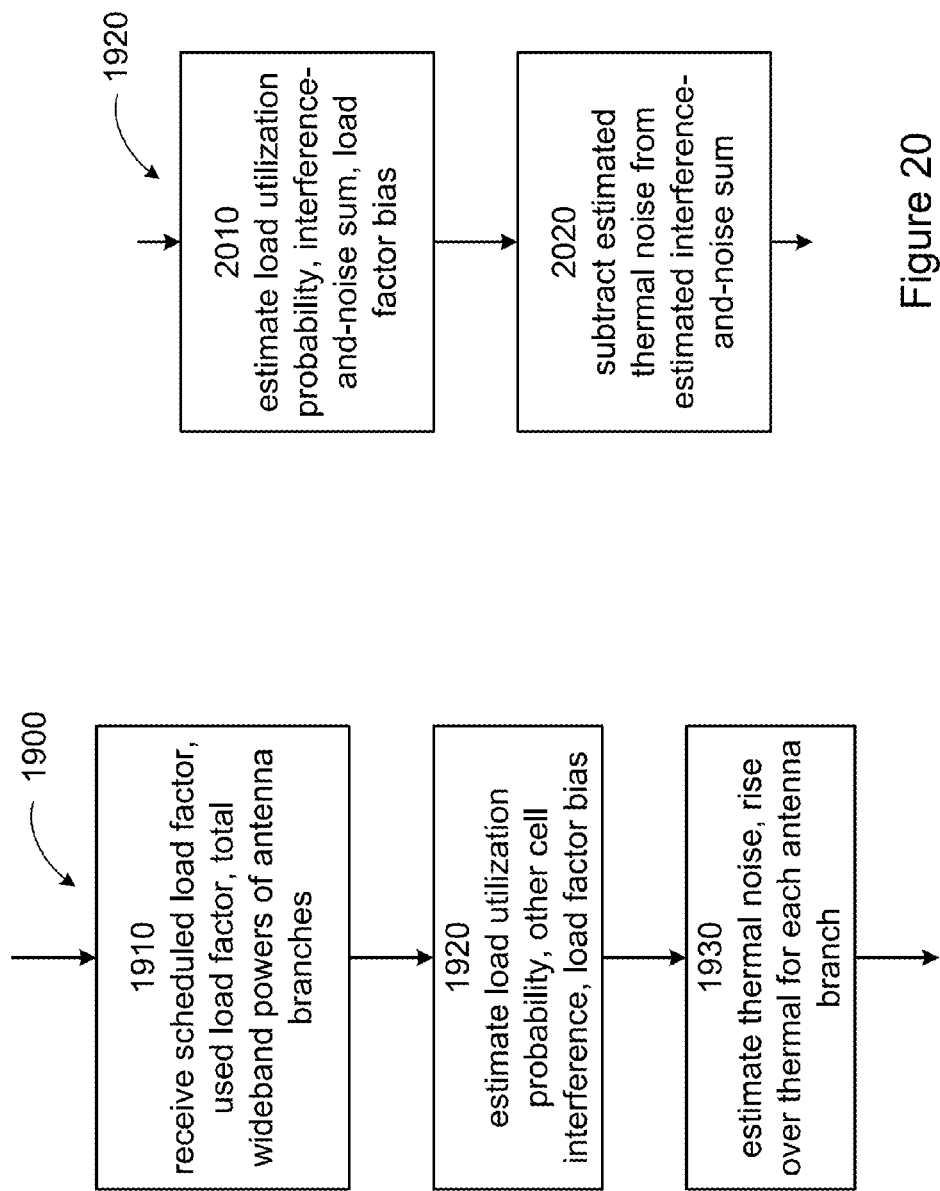

US 9,301,172 B2

METHOD, APPARATUS, AND SYSTEM FOR INTERFERENCE AND NOISE ESTIMATION

RELATED APPLICATION

This application may be related, at least in part, to U.S. patent application Ser. No. 13/488,187 entitled "OTHER CELL INTERFERENCE ESTIMATION" filed Jun. 4, 2012, which is incorporated herein by reference in its entirety.

TECHNICAL FIELD

The technical field of the present disclosure generally relates to estimating other cell interferences in a wireless network. In particular, the technical field relates to apparatus(es), method(s), and/or system(s) for estimating other cell interferences using load utilization measurements.

BACKGROUND

Recently, at least the following trends have emerged in the field of cellular telephony. First, mobile broadband traffic has been exploding in wireless networks such as WCDMA (wideband code division multiple access). The technical consequence is a corresponding steep increase of the interference in these networks, or equivalently, a steep increase of the load. This makes it important to exploit the load headroom that is left in the most efficient way.

Second, cellular networks are becoming more heterogeneous, with macro RBSs (radio base station) being supported by micro and pico RBSs at traffic hot spots. Furthermore, home base stations (e.g., femto RBSs) are emerging in many networks. This trend puts increasing demands on inter-cell interference management.

Third, the consequence of the above is a large increase of the number of network nodes in cellular networks, together with a reduced operator control. There is therefore a strong desire to introduce more self-organizing network (SON) functionality. Such functionality may support interference management by automatic interference threshold setting and adaptation, for a subset of the nodes of the cellular network.

To meet these new trends, high accuracy and high bandwidth load estimation becomes very important. Here, the high bandwidth, high accuracy estimation of the experienced neighbor cell interference is troublesome, particularly in WCDMA networks. The neighbor cell interference in this context is the interference experienced at an own cell due to activities of cells other than the own cell. Thus, the neighbor cell interference may also be referred to as other cell interference.

In as far as the inventor is aware, there does not yet exist a practical other cell interference estimation algorithm that can, at the same time:
- provide other cell interference estimates with an inaccuracy better than 10-20%, and does so with close to transmission time interval (TTI, typically 2 ms or 10 ms) bandwidth (typically 250 or 50 Hz) over interested power and load ranges;
- account for a high bandwidth measured load utilization probability.

Also in as far as the inventor is aware, there does not yet exist an other cell interference estimation architecture that combines the quantities a-d listed below into an estimated other cell interference:
a. Thermal noise power floor levels, estimated per antenna branch and carrier;
b. Measured received uplink wideband power, per antenna branch and carrier;
c. Own cell load factors, obtained from the scheduler, valid per cell;
d. Load utilization probability measurements, obtained from transport format indicator information, valid per cell.

As a result, it is difficult or even impossible to make optimal scheduling decisions since the exact origin of the interference power in the uplink (UL) is unknown. In WCDMA for example, the UEs (user equipments) may or may not utilize the power granted by the EUL (enhanced uplink) scheduler. This leads to an inaccuracy of the load prediction step, where the scheduler bases its scheduling decision on a prediction of the resulting air interface load of the traffic it schedules. This is so since the 3GPP standard has an inherent delay of about at least 5 TTIs (transmission time interval) from the scheduling decision until the interference power appears over the air interface. Also the WCDMA load prediction does not account for all imperfections in the modeling of an UL (uplink) radio receiver. This can lead to additional inaccuracies in the load prediction and estimation steps.

Furthermore, it is difficult to manage interference in heterogeneous networks (HetNets) in an optimal way. This is logical since different actions are needed depending on the origin of the interference power. This is easily understood in overload situations, since then the correct cell needs to receive power down commands, e.g., in the form of reduced thresholds to resolve the situation.

Load Estimation without Other Cell Interference Estimation

Following is a discussion on measurement and estimation techniques to measure instantaneous total load on the uplink air interface given in a cell of a WCDMA system. In general, a load at the antenna connector is given by noise rise, also referred to as rise over thermal, RoT(t), defined by:

$$RoT(t) = \frac{P_{RTWP}(t)}{P_N(t)}, \qquad (1)$$

where $P_N(t)$ is the thermal noise level at the antenna connector. For the purposes of discussion, $P_{RTWP}(t)$ may be viewed as the total wideband power defined by:

$$P_{RTWP}(t) = \sum_{i=1}^{I} P_i(t) + P_{other}(t) + P_N(t), \qquad (2)$$

also at the antenna connector. The total wideband power $P_{RTWP}(t)$ is unaffected by any de-spreading applied. In equation (2), $P_{other}(t)$ represents the power received from one or more cells of the WCDMA system other than an own cell. The $P_i(t)$ are the powers of the individual users in the own cell. One major difficulty of any RoT estimation technique is the inability to separate the thermal noise $P_N(t)$ from the interference $P_{other}(t)$ from other cells.

Another problem is that the signal reference points are, by definition, at the antenna connectors. The measurements are however obtained after the analog signal conditioning chain in the digital receiver. The analog signal conditioning chain introduces a scale factor error of about 1 dB (1-sigma) for which it is difficult to compensate. Fortunately, all powers of in equation (2) are equally affected by the scale factor error so when equation (1) is calculated, the scale factor error is cancelled as follows:

$$RoT^{Digital\ Receiver}(t) = \frac{P_{RTWP}^{Digital\ Receiver}(t)}{P_N^{Digital\ Receiver}(t)} = \frac{\gamma(t)P_{RTWP}^{Antenna}(t)}{\gamma(t)P_N^{Antenna}(t)} = RoT^{Antenna}(t). \quad (3)$$

To understand the problem of interferences from other cells when performing load estimation, note that:

$$P_{other}(t)+P_N(t)=E[P_{other}(t)]+E[P_N(t)]+\Delta P_{other}(t)+\Delta P_N(t). \quad (4)$$

where E[ ] denotes a mathematical expectation and where Δ denotes a variation around the mean.

The problem can now be seen. Since there are no measurements available in the RBS that are related to the other cell interference, a linear filtering operation can at best estimate the sum $E[P_{other}(t)]+E[P_N(t)]$. This estimate cannot be used to deduce the value of $E[P_N(t)]$. The situation is the same as when the sum of two numbers is available. Then there is no way to determine the individual values of $E[P_{other}(t)]$ and $E[P_N(t)]$. It has also been formally proved that the thermal noise power floor is not mathematically observable in case there is a non-zero mean other cell interference present in the uplink.

FIG. 1 illustrates a conventional algorithm that estimates a noise floor. The illustrated algorithm is referred to as a sliding window algorithm, and estimates the RoT as given by equation (1). The main problem solved by this conventional sliding window algorithm is that it can provide an accurate estimation of the thermal noise floor N(t). Since it is not possible to obtain exact estimates of this quantity due to the other cell interference, the sliding window estimator therefore applies an approximation, by considering a soft minimum computed over a relative long window in time. Note that the sliding window estimator relies on the fact that the noise floor is constant over very long periods of time (disregarding small temperature drift).

One significant disadvantage of the sliding window estimator is that the algorithm requires a large amount of memory. This becomes particularly troublesome in case a large number of instances of the algorithm is needed, as may be the case when the interference cancellation (IC) is introduced in the uplink.

A recursive algorithm has been introduced to reduce the memory consumption. Relative to the sliding window algorithm, the recursive algorithm can reduce the memory requirement by a factor of more than one hundred to a thousand.

Load Prediction without Interference Power Estimation

Following is a discussion on techniques to predict instantaneous load on the uplink air interface ahead in time. The scheduler uses this functionality. The scheduler tests different combinations of grants to determine the best combinations, e.g., maximizing the throughput. This scheduling decision will only affect the air interface load after a number of TTIs (each such TTI a predetermined time duration such as 2 or 10 ms), due to grant transmission latency and UE latency before the new grant takes effect over the air interface.

In a conventional SIR (signal-to-interference ratio) based method, the prediction of uplink load, for a tentative scheduled set of UEs and grants, is based on the power relation defined by:

$$P_{RTWP}(t) - P_N(t) = \sum_{i=1}^{N} L_i(t)P_{RTWP}(t) + P_{other}(t), \quad (5)$$

where $L_i(t)$ is the load factor of the i-th UE of the own cell. As indicated, $P_{other}(t)$ denotes the other cell interference. The load factors of the own cell are computed as follows. First, note that:

$$(C/I)_i(t) = \frac{P_i(t)}{P_{RTWP}(t) - (1-\alpha)P_i} = \quad (6)$$

$$\frac{L_i(t)P_{RTWP}(t)}{P_{RTWP}(t) - (1-\alpha)L_i(t)P_{RTWP}(t)} = \frac{L_i(t)}{1-(1-\alpha)L_i(t)}$$

$$\Leftrightarrow$$

$$L_i(t) = \frac{(C/I)_i(t)}{1+(1-\alpha)(C/I)_i(t)},$$

$$i = 1, \ldots, I,$$

where I is the number of UEs in the own cell and α is the self-interference factor. The carrier-to-interference values, $(C/I)_i(t), i=1, \ldots, I$, are then related to the SINR (measured on the DPCCH channel) as follows:

$$(C/I)_i(t) = \quad (7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right),$$

$$i = 1, \ldots, I.$$

In equation (7), $W_i$ represents the spreading factor, RxLoss represents the missed receiver energy, G represents the diversity gain and the βs represent the beta factors of the respective channels. Here, inactive channels are assumed to have zero data beta factors.

The UL load prediction then computes the uplink load of the own cell by a calculation of equations (6) and (7) for each UE of the own cell, followed by a summation:

$$L_{own}(t) = \sum_{i=1}^{I} L_i(t), \quad (8)$$

which transforms equation (5) to:

$$P_{RTWP}(t) = L_{own}(t)P_{RTWP}(t) + P_{other}(t) + P_N(t). \quad (9)$$

Dividing equation (9) by $P_N(t)$ shows that the RoT can be predicted k TTIs ahead as:

$$RoT(t+kT) = \frac{P_{other}(t)/P_N(t)}{1 - L_{own}(t)} + \frac{1}{1 - L_{own}(t)}. \quad (10)$$

In the SIR based load factor calculation, the load factor $L_i(t)$ is defined by equation (6). However, in a power based load factor calculation, the load factor $L_i(t)$ can be defined by:

$$L_i(t) = \frac{P_i(t)}{P_{RTWP}(t)}, \quad (11)$$
$$i = 1, \ldots, I,$$

and equations (8)-(10) may be calculated based on the load factor $L_i(t)$ of equation (11) to predict the RoT k TTIs ahead. An advantage of the power based load factor calculation is that the parameter dependence is reduced. On the downside, a measurement of the UE power is needed. But in certain circumstances, the power based load factor calculation may be preferred.

HetNets

In heterogeneous networks (HetNets), different kinds of cells are mixed. A problem that arises in Hetnets in that the cells are likely to have different radio properties in terms of (among others):
  radio sensitivity;
  frequency band;
  coverage;
  output power;
  capacity; and
  acceptable load level.

This can be an effect of the use of different RBS sizes (macro, micro, pico, femto), different revisions (different receiver technology, SW quality), different vendors, the purpose of a specific deployment, and so on. An important factor in HetNets is that of the air interface load management, i.e., the issues associated with the scheduling of radio resources in different cells and the interaction between cells in terms of inter-cell interference.

These issues are exemplified with reference to FIG. 2 which illustrates a low power cell with limited coverage intended to serve a hotspot. To enable sufficient coverage of the hot spot, an interference suppressing receiver like the G-rake+ is used. One problem is now that the low power cell is located in the interior of and at the boundary of a specific macro cell. Also, surrounding macro cells interfere with the low power cell rendering a high level of other cell interference in the low power cell which, despite the advanced receiver, reduces the coverage to levels that do not allow coverage of the hot spot. As a result, UEs of the hot spot are connected to the surrounding macro cells, which can further increase the other cell interference experienced by the low power cell.

SUMMARY

A non-limiting aspect of the disclosed subject matter is directed to a method performed by a noise and interference predictor of a radio network node corresponding to a cell of interest in a wireless network. The radio network node can comprise a total of M antenna branch(es), M being a positive integer. The method comprises receiving a scheduled load factor $L_{own}(t_0)$ applicable at time $t=t_0$; receiving a used load factor $\bar{L}_{own}(t_0)$ applicable at time the $t=t_0$; and receiving, for each antenna branch m, m=1 . . . M, a corresponding total wideband power $P_{RTWP}^m(t_0)$ applicable at the time $t=t_0$. The method also comprises determining a load utilization probability estimate $\hat{p}_{load}(t_1)$ and an other cell interference estimate $\hat{P}_{other}(t_1)$, both applicable at time $t=t_1$, based on the scheduled load factor $L_{own}(t_0)$, the used load factor $\bar{L}_{own}(t_0)$, and the M total wideband power(s) $P_{RTWP}^m(t_0)$, wherein $t_1-t_0=T>0$. The method further comprises determining, for each antenna branch m, a corresponding thermal noise estimate $\hat{P}_N^m(t_1)$ and a corresponding rise-over-thermal estimate $\hat{RoT}^m(t_1)$, both applicable at the time $t=t_1$, based on the corresponding total wideband power $P_{RTWP}^m(t_0)$. $L_{own}(t)$ represents resource grants scheduled for use at time t to one or more cell terminals in the cell of interest, $\bar{L}_{own}(t)$ represents resource grants used at time t by the same cell terminals, and each $P_{RTWP}^m(t)$ represents the total wideband power present at time t at the antenna branch m. $\hat{p}_{load}(t)$ represents an estimate of the load utilization probability $p_{load}(t)$ which expresses a probability of resources grants for use at time t actually being used at time t, $\hat{P}_{other}(t)$ represents an estimate of the other cell interference $P_{other}(t)$ which expresses a sum of interferences present in the cell of interest at time t due to wireless activities applicable in one or more cells other than in the cell of interest, each $\hat{P}_N^m(t)$ represents an estimate of the corresponding thermal noise $P_N^m(t)$ which expresses a sum of undesired signals present at time t at the antenna branch m excluding the other cell interference $P_{other}(t)$, and each $\hat{RoT}^m(t)$ represents an estimate of the corresponding rise-over-thermal $RoT^m(t)$ present at time t at the antenna branch m, the rise-over-thermal being defined as $$RoT^m(t) = \frac{P_{RTWP}^m(t)}{P_N^m(t)}.$$

Another non-limiting aspect of the disclosed subject matter is directed to a non-transitory computer-readable medium which has stored therein programming instructions. When a computer executes the programming instructions, the computer executes the method performed in a noise and interference predictor of a radio network node of a wireless network as described above.

Yet another non-limiting aspect of the disclosed subject matter is directed to a radio network node of a wireless network. The radio network node may include M antenna branches, where M being a positive integer. The radio network node comprise a scheduler structured to determine a scheduled load factor $L_{own}(t_0)$ applicable at time $t=t_0$, a resource use determiner structured to determine a used load factor $\bar{L}_{own}(t_0)$ applicable at the time the $t=t_0$, a power meter structured to determine for each antenna branch m, m=1 . . . M, a total wideband power $P_{RTWP}^m(t_0)$ all applicable at time the $t=t_0$, an other cell interference estimator structured to determine a load utilization probability estimate $\hat{p}_{load}(t_1)$ and an other cell interference estimate $\hat{P}_{other}(t_1)$, both applicable at time $t=t_1$, based on the scheduled load factor $L_{own}(t_0)$, the used load factor $\bar{L}_{own}(t_0)$, and the M total wideband power(s) $P_{RTWP}^m(t_0)$, wherein $t_1-t_0=T>0$ and M noise estimator(s) corresponding to the M antenna branch(es), wherein each noise estimator is structured to determine a corresponding thermal noise estimate $\hat{P}_N^m(t_1)$ and a corresponding rise-over-thermal estimate $\hat{RoT}^m(t_1)$, both applicable at the time $t=t_1$, based on the corresponding total wideband power $P_{RTWP}^m(t_0)$.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 9 illustrates a flow chart of another example process performed by a radio network node to estimate the load utilization probability and to estimate the interference-and-noise sum;

FIG. 10 illustrates a flow chart of an example process performed by a radio network node to obtain an interference-and-noise sum estimate;

FIG. 19 illustrates a flow chart of example method performed by a noise and interference predictor of a radio network node;

FIG. 20 illustrates a flow chart of an example process performed by the other cell interference estimator to estimate the load utilization probability and to estimate the interference-and-noise sum when there is a single antenna branch.

DETAILED DESCRIPTION

Figure 1:
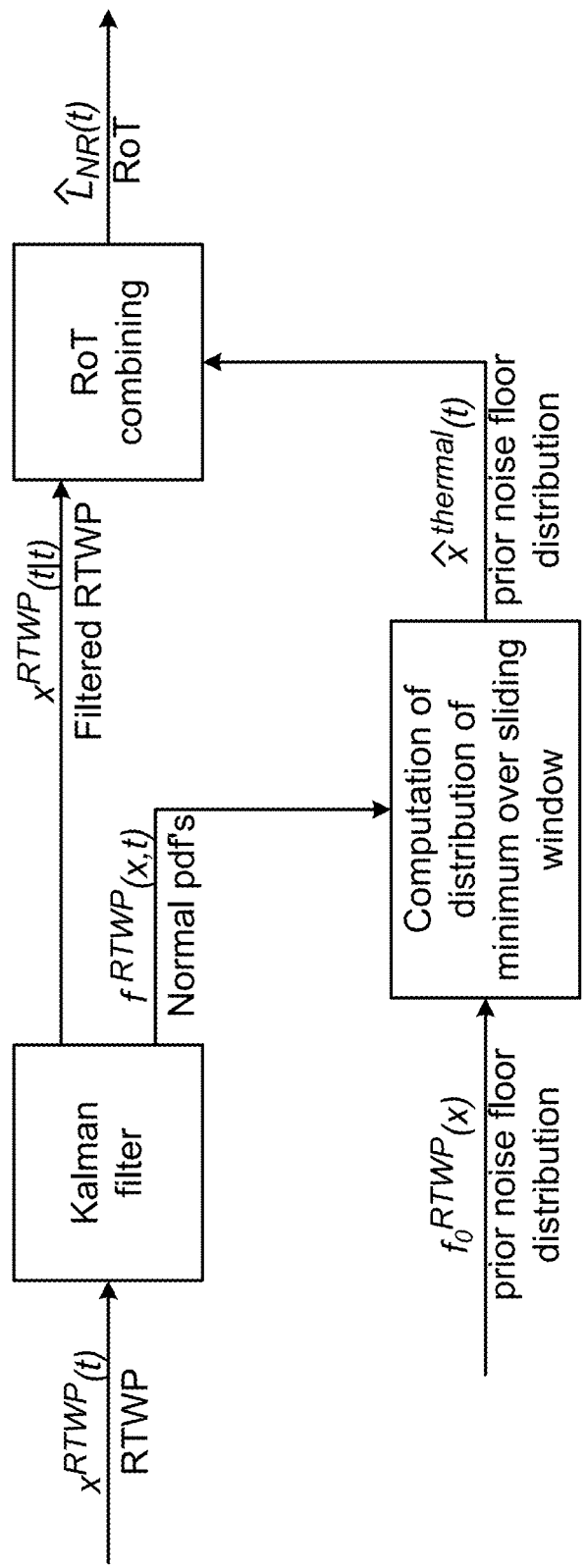
FIG. 1 illustrates a conventional algorithm that estimates a noise floor.
Figure 2:
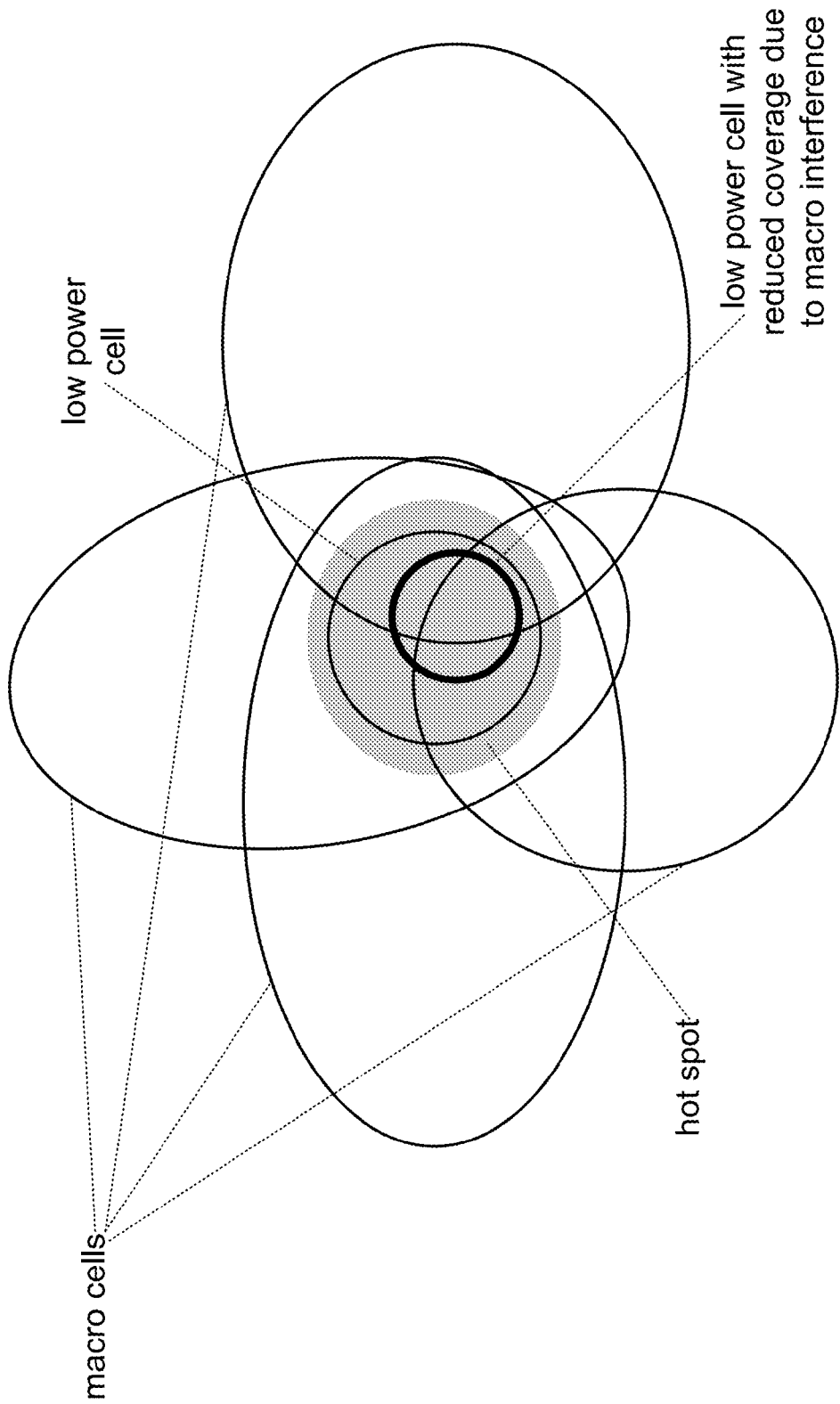
FIG. 2 illustrates an example scenario of a low power cell with limited coverage intended to serve a hotspot.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiMAX, cdma2000, 1xEVDO, as well as to any future cellular standard employing any kind of code division multiple access (CDMA) access. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a radio network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

From this discussion thus far, it is clear that it would be advantageous if the RNC (radio network controller) or the surrounding RBSs could be informed of the interference situation and take action, using e.g., admission control in the RNC or new functionality in the surrounding RBSs to reduce other cell interference. For HetNets in particular, being informed of the interference situation would allow the RNC or the RBSs to provide a better management of the hot spot traffic—in terms of air interface load. In HetNets, an important factor is that of air interface load management, i.e., issues associated with the scheduling of radio resources in different cells and the interaction between cells in terms of inter-cell interference. Of particular interest are the algorithmic architectures associated with such air-interface load management, for example, in the UL of the WCDMA system. The reasons for the interest include the need optimize performance in HetNets, and that the concept of load can change with the introduction of G-rake+, or other interference suppression or interference cancelling receiver types.

But regardless of the network architecture, whether HetNet or not, the network nodes, e.g., the RBSs, should have the capability to accurately estimate the other cell interference. This requires a careful consideration of the algorithmic architectures involved.

As noted, there does not yet exist a practical other cell interference estimation algorithm that can, at the same time:

provide other cell interference estimates with an inaccuracy better than 10-20%, and does so with close to transmission time interval (TTI, typically 2 ms or 10 ms) bandwidth (typically 250 or 50 Hz) over interested power and load ranges;

account for a high bandwidth measured load utilization probability.

Also, there does not yet exist an other cell interference estimation architecture that combines the quantities a-d listed below into an estimated other cell interference:

a. Thermal noise power floor levels, estimated per antenna branch and carrier;

b. Measured received uplink wideband power, per antenna branch and carrier;

c. Own cell load factors, obtained from the scheduler, valid per cell;

d. Load utilization probability measurements, obtained from transport format indicator information, valid per cell.

To address the above-discussed problems and other problems related with conventional techniques, the disclosed subject matter includes at least the following non-limiting innovative aspects:

Method, apparatus, and/or system that estimates the sum of all other cell interferences, experienced in the own cell context, using measurements of the load utilization and the total wideband received uplink power, as well as a computed own cell load. The estimating algorithm can be run in the RBS base band;

Method, apparatus, and/or system that combines the wideband received power (per antenna branch and carrier), the measured load utilization probability (per cell), the computed scheduled load factor (per cell), and estimated thermal noise power floor levels (per antenna branch and carrier), to provide a high bandwidth and high accuracy per cell other cell interference estimate according to the method, apparatus, and/or system of the first bullet;

Method, apparatus, and/or system that combines the wideband received power (per antenna branch and carrier), the measured load utilization probability (per cell), the computed scheduled load factor (per cell), and estimated thermal noise power floor levels (per antenna branch and carrier), to provide a high bandwidth and high accuracy per antenna branch other cell interference estimate according to the method, apparatus, and/or system of the first bullet.

Other Cell Interference Estimation

As indicated above, one major disadvantage of many conventional RoT(t) estimation techniques is in the difficulty in separating the thermal noise $P_N(t)$ from the interference $P_{other}(t)$ from other cells. This makes it difficult to estimate the RoT(t), i.e., difficult to estimate the load as given in equation (1). The other cell interference $P_{other}(t)$ in this context may be viewed as a sum of interferences present in a cell of interest due to wireless activities applicable at time t in one or more cells other than in the cell of interest. In one or more aspects, the determination of the other cell interference $P_{other}(t)$ involves estimating the other cell interference. For the purposes of this disclosure, estimations of parameters are indicated with a "^" (caret) character. For example, $\hat{P}_{other}(t)$ may be read as an estimate of the other cell interference $P_{other}(t)$.

There are known techniques to determine the other cell interference estimate $\hat{P}_{other}(t)$. These conventional techniques assume that the powers of all radio links are measured in the uplink receiver. This assumption is not true in many instances today. The power measurement is associated with difficulties since:

In WCDMA for example, the uplink transmission is not necessarily orthogonal, which can cause errors when the powers are estimated.

The individual code powers are often small, making the SNRs (signal-to noise ratio) low as well. This further contributes to the inaccuracy of the power estimates.

One major problem associated with the conventional other cell interference estimation techniques is that the sum of other cell interference and thermal noise $P_{other}(t)+P_N(t)$ (referred to as interference-and-noise sum) needs to be estimated through high order Kalman filtering. The primary reason is that all powers of the UEs need to be separately filtered using at least one Kalman filter state per UE when such techniques are used. This step therefore is associated with a very high computational complexity. There are techniques that can reduce this computational complexity, but the complexity can be still too high when the number of UEs increases. In these conventional solutions, the thermal noise floor N(t) is estimated as described above, i.e., $\hat{N}(t)$ is determined followed by a subtraction to arrive at the other cell interference estimate $\hat{P}_{other}(t)$.

In the conventional solutions, the EUL utilizes a scheduler that aims to fill the load headroom of the air interface, so that the different UE requests for bitrates are met. As stated above, the air-interface load in WCDMA is determined in terms of the noise rise over the thermal power level, i.e., the RoT(t), which is estimated at the base station.

Figure 3:
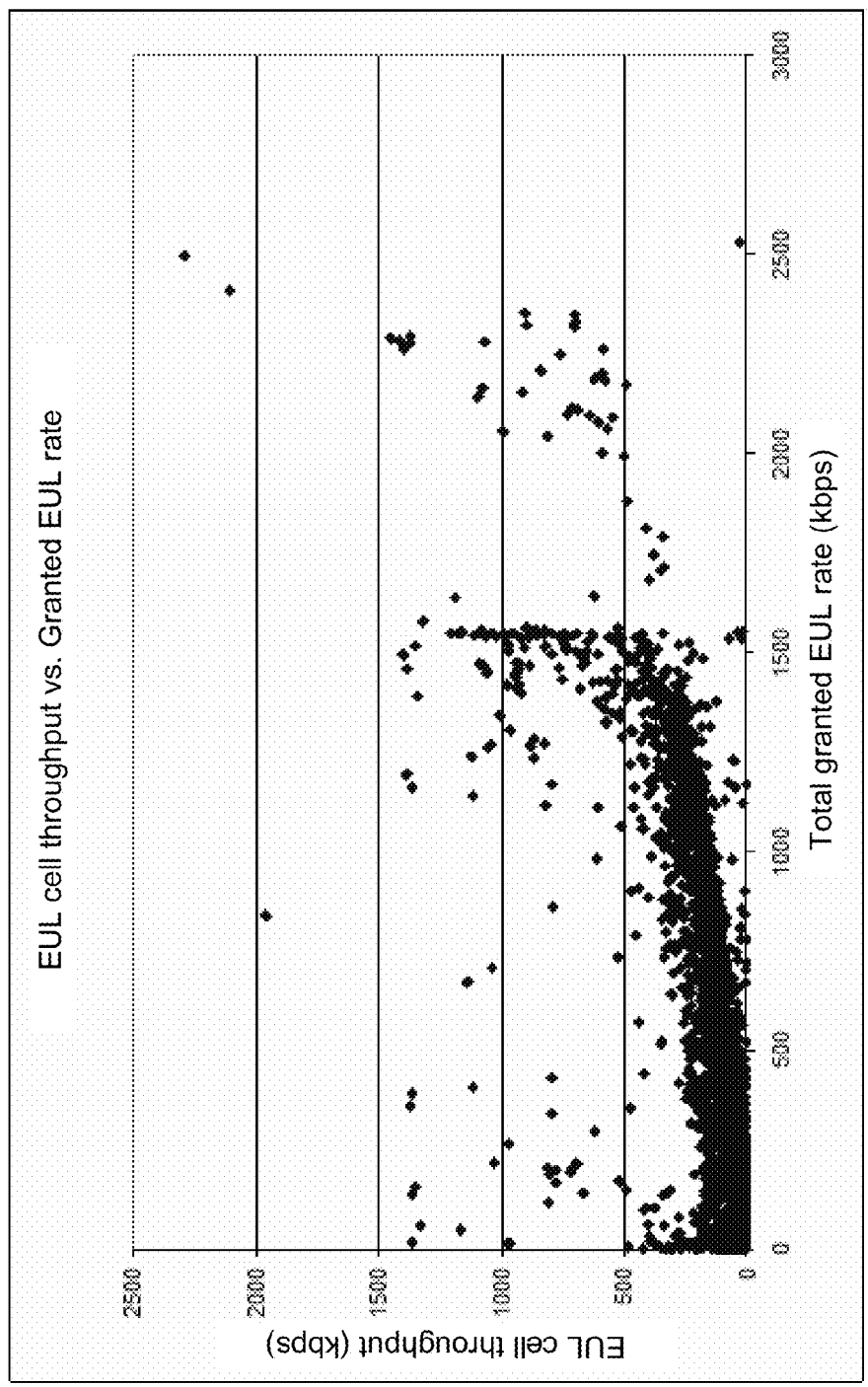
FIG. 3 illustrates a plot of a grant utilization probability.

When evaluating scheduling decisions, the scheduler predicts the load that results form the scheduled grants, to make sure that the scheduled load does not exceed the load thresholds for coverage and stability. This can be complicated since the grant given to a UE only expresses a limit on the UL power the UE is allowed to use. However, the UE may actually use only a portion of its grant. The conventional scheduler makes a worst case analysis, assuming that all UEs will use their grants at all times. But in reality, UEs in general have a relatively low utilization of grants. This is evident from field measurements as those depicted in FIG. 3. The plot indicates a grant utilization of only about 25%. In other words, a significant amount (about 75%) of air-interface resources is wasted.

To summarize, the lack of technology for estimation of the load utilization probability and its variance can have at least the following disadvantages:

Can lead to an underutilization of the air interface, due to the fact that UEs often do not use all the power granted to them;

Can lead to a general inaccuracy of the load prediction, since unmodelled receiver impairments are not captured correctly by a load utilization probability estimate.

Regarding HetNets in particular, problems associated with conventional scheduling techniques can be explained in a relatively straightforward manner. For scheduling in the base station in general, prior techniques require measurement of all UE powers in the UL. This is very costly computationally, requiring Kalman filters of high order for processing the measurements to obtain estimates of the other cell interference power. This is because each own cell UE adds a state to the Kalman filter. The consequence, if such estimation cannot be done, is that the scheduler is unaware of the origin of the interference, thereby making it more difficult to arrive at good scheduling decisions. For HetNets, the problem is again that there is no information of the origin of interference, and interference variance, for adjacent cells. This is primarily due to the lack of low complexity estimators for these quantities.

Recall that in conventional scheduling techniques, there is a delay of some number of TTIs from the scheduling decision until the interference power appears over the air interface. The scheduler also bases its scheduling decisions on a prediction of the load of the traffic it schedules. Since the UEs do not always utilize power granted by the scheduler, the load prediction is likely to be inaccurate. The inaccuracy tends to increase as the delay increases. To address this issue, measurements of momentary load utilization may be made and accounted for in the estimation of other cell interferences. Also recall that load prediction does not account for all imperfections in the modeling of the UL receiver. To address this issue, load factor bias may be estimated, e.g., when other cell interference is estimated.

In one aspect, the inventive estimator includes an UL nonlinear interference model that is responsive to:
  a. a scheduled own cell load factor $L_{own}(t)$, an estimated load utilization probability $\hat{p}_{load}(t)$ (note the lower case "p"), an estimated interference-and-noise sum $\hat{P}_{other}(t)+\hat{P}_N(t)$ (note the upper case "P"), and (optionally) an estimated load factor bias $\Delta\hat{L}_{own}(t)$, these quantities expressing an UL load curve relationship; or
  b. an estimated own cell load factor $\hat{L}_{own}(t)$, an estimated interference-and-noise sum $\hat{P}_{other}(t)+\hat{P}_N(t)$, and (optionally) an estimated load factor bias $\Delta\hat{L}_{own}(t)$, these quantities expressing an UL load curve relationship.

The estimator can be responsive to:
  a. a measured total wideband power $y_{RTWP}(t)$, a measured load utilization probability $p_{load}(t)$ a received uplink own cell load factor $L_{own}(t)$, and the UL nonlinear interference model; or
  b. a measured total wideband power $y_{RTWP}(t)$, a measured own cell load factor $L_{own}(t)$, and the UL nonlinear interference model.

The estimator can also be responsive to a dynamic model for propagation of the estimated states. The estimated states can include:
  a. the estimated interference-and-noise sum $\hat{P}_{other}(t)+\hat{P}_N(t)$, the estimated load utilization probability $\hat{p}_{load}(t)$, (optionally) the estimated load factor bias $\Delta\hat{L}_{own}(t)$ and at least one delay line state; or
  b. the estimated interference-and-noise sum $\hat{P}_{other}(t)+\hat{P}_N(t)$, the estimated own cell load factor $L_{own}(t)$, (optionally) the estimated load factor bias $\Delta\hat{L}_{own}(t)$ and at least one delay line state.

The estimator can further be responsive to an estimated thermal noise $\hat{P}_N(t)$, and provide an estimated other cell interference $\hat{P}_{other}(t)$ For example, the other cell interference estimate $\hat{P}_{other}(t)$ may be arrived at by subtracting the thermal noise estimate $\hat{P}_N(t)$ from the interference-and-noise sum estimate $\hat{P}_{other}(t)+\hat{P}_N(t)$.

In the discussion above, the values of parameters are "estimated", "measured", "received" or "computed". A measured value in essence can be viewed a number that expresses a value of a measured quantity. An estimated value is not a number that expresses a value of a measurement, at least not directly. Rather, an estimate can be viewed as a processed set of measurements, e.g., by some filtering operation. There can also be received and/or computed quantities, such as time varying parameters that are obtained from other sources. It is stressed that measured or estimated quantities can be very different, such as in case where the measured and estimated quantity refer to the same underlying physical quantity, e.g., a specific power. One among many reasons for this is that the processing to obtain estimates may combine measurements from different times to achieve e.g., noise suppression and bias reduction.

Also in the discussion above, "a" and "b" represent alternative embodiments. In the discussion below, alternative "a" will be described in detail, and some comments on the difference between the alternative will be provided. One very significant advantage of the disclosed estimator is its low order and associated low computational complexity. In one embodiment, the estimator can be a variant of an extended Kalman filter (EKF), arranged for processing using the nonlinear interference model. The disclosed estimation models can be applied to one or both of the sliding window and the recursive RoT estimation algorithms. Either SIR or power based load factor calculation may be used. The power based calculation may be preferred however.

Recall from the discussion regarding HetNets that the surrounding macro cells can interfere with the low power cell to levels such that the UEs of the hotspot are actually connected to the macro cells. To address such issues, in one or more aspects of disclosed subject matter, RNC or the surrounding RBSs can be informed of the interference situation and can take action as appropriate. For example, admission control in the RNC or functionalities in the surrounding RBSs can be used to reduce the other cell interference and provide better management of the hot spot traffic, e.g., in terms of air interface load. To enable this to take place, the RBS can include capabilities to estimate the other cell interference.

Figure 4:
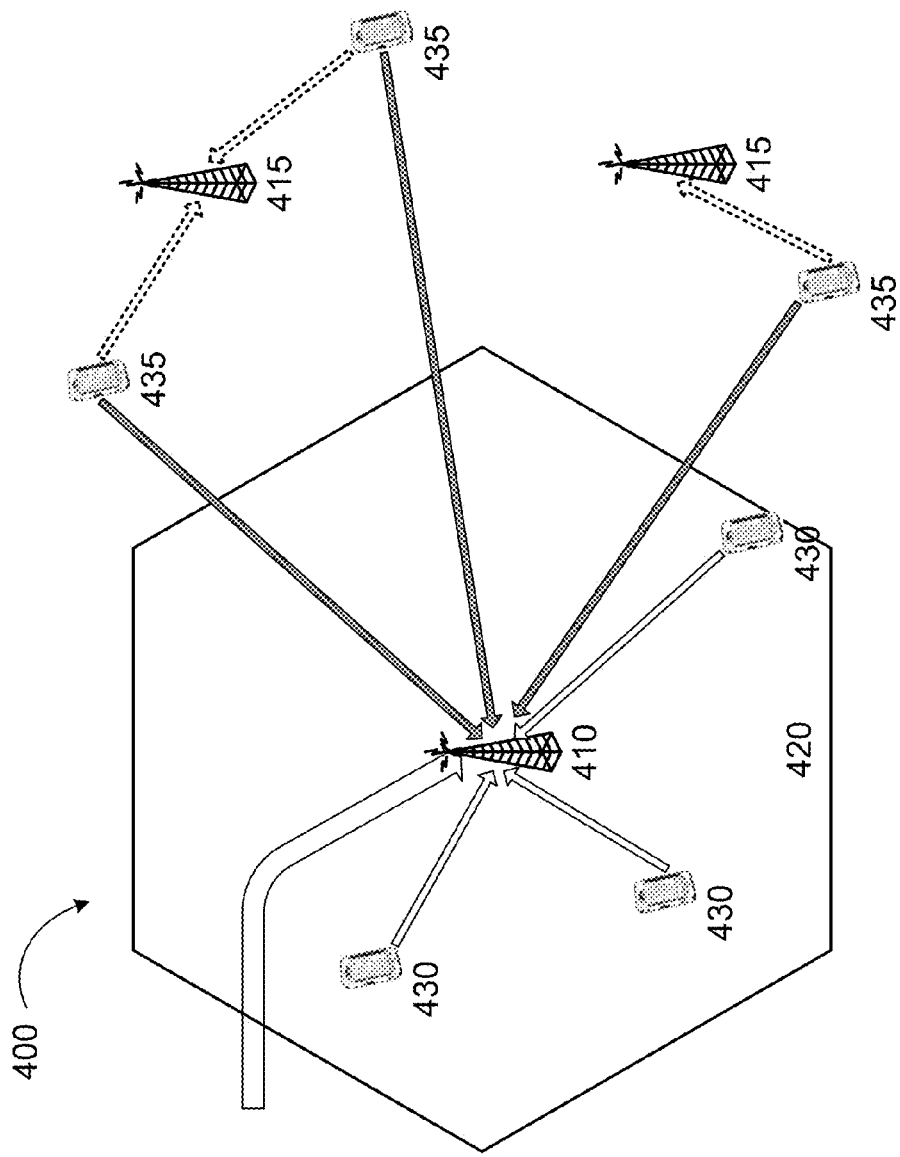
FIG. 4 illustrates an example scenario in which other cell interference is determined.

FIG. 4 illustrates an example scenario in which a radio network node 410 (e.g., eNB, eNode B, Node B, base station (BS), radio base station (RBS), and so on) can estimate the other cell interference. In the figure, the radio network node 410 serves one or more wireless terminals 430 (e.g., user equipment, mobile terminal, laptops, M2M (machine-to-machine) terminals, etc.) located within a corresponding cell 420. For clarity, the radio network node 410 will be referred to as an own radio network node, the cell 420 will be referred to as the cell of interest, and the terminals 430 within the cell of interest 420 will be referred to as own terminals. Uplink signaling and data traffic from the own terminals 430 to the own radio network node 410 are illustrated as solid white arrows.

The scenario in FIG. 4 also includes other radio network nodes 415 serving other wireless terminals 435 as indicated by dashed white arrows. When the other terminals 435 transmit to their respective other radio network nodes 415, these signals are also received in the own radio network node 410 as indicated by shaded solid arrows. Such signals act as interferers within the cell of interest 420. A sum of powers of these interfering signals experienced at the own radio network node 410 at time t will be denoted as $P_{other}(t)$ In other words, the other cell interference $P_{other}(t)$ may be viewed as expressing a sum of interferences present in the cell of interest due to wireless activities applicable at time t in one or more cells other than in the cell of interest 420. Further, there is a large solid white arrow with no particular source. This represents the thermal noise $P_N(t)$ experienced in the own radio network node 410 of the cell of interest 420 at time t.

Figure 5:
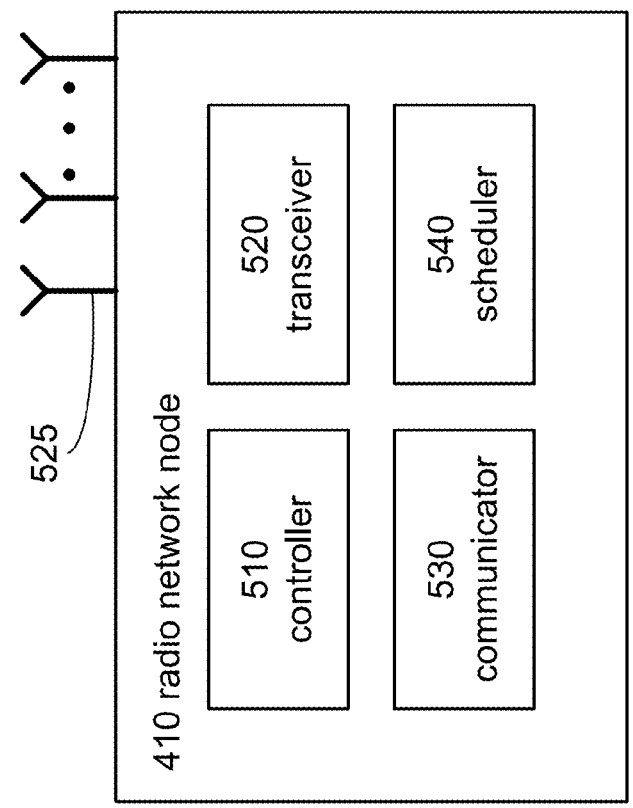

FIG. 5 illustrates an example embodiment of a radio network node 410. The radio network node 410 may comprise several devices including a controller 510, a transceiver 520, a communicator 530 and a scheduler 540. The transceiver 520 may be structured to wirelessly communicate with wireless terminals 430. The communicator 530 may be structured to communicate with other network nodes and with core network nodes. The controller 510 may be structured to control the overall operations of the radio network node 410.

Figure 6:
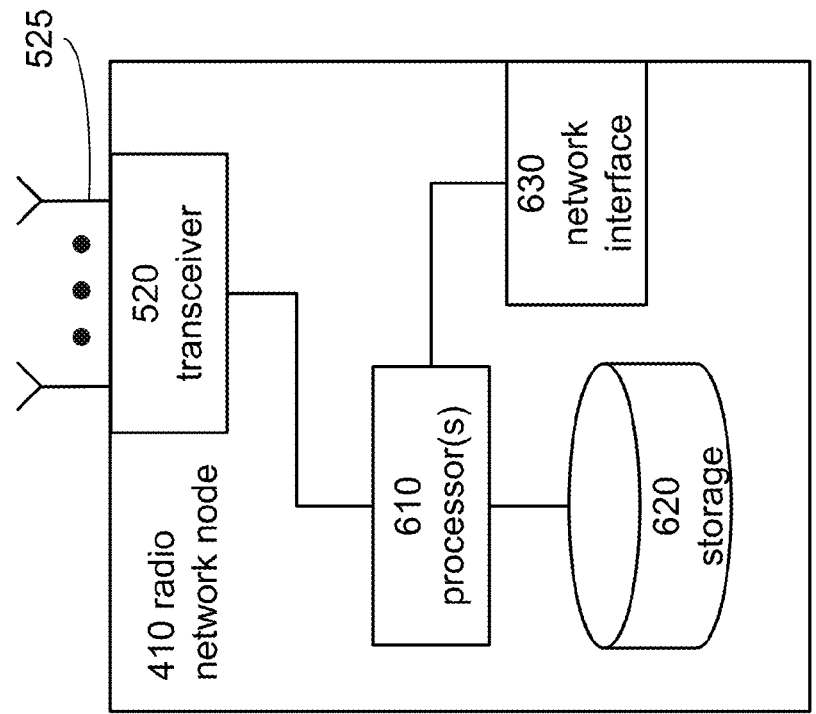
FIGS. 5 and 6 respectively illustrate example embodiments of a radio network node.

FIG. 5 provides a logical view of the radio network node. It is not strictly necessary that each device be implemented as physically separate modules or circuits. Some or all devices may be combined in a physical module. Also, one or more devices may be implemented in multiple physical modules as illustrated in FIG. 6.

The devices of the radio network node 410 as illustrated in FIG. 5 need not be implemented strictly in hardware. It is envisioned that any of the devices maybe implemented through a combination of hardware and software. For example, as illustrated in FIG. 6, the radio network node 410 may include one or more central processing units 610 executing program instructions stored in a storage 620 such as non-transitory storage medium or firmware (e.g., ROM, RAM, Flash) to perform the functions of the devices. The radio network node 410 may also include a transceiver 520 structured to receive wireless signals from the wireless terminals 430 and to send signals to the wireless terminals 430 over one or more antennas 525 in one or more channels. The radio network node 410 may further include a network interface 630 to communicate with other network nodes such as the core network nodes.

In one or more aspects, the radio network node 410 can be structured to implement a high performing estimator. The disclosed estimator can perform a joint estimation of interfering powers $P_{other}(t)+P_N(t)$, $P_N(t)$, $P_{other}(t)$ (note the upper case "P") and the load utilization probability $p_{load}(t)$ (note the lower case "p"). An extended Kalman filter (EKF) can be used in one or more embodiments of the proposed estimator.

The disclosed estimator can use any one or more of the following information:

Measurements of $P_{RTWP}(t)$, with a sampling rate of $T_{RTWP}=k_{RTWP}TTI$, $k_{RTWP} \in Z+$. Here Z+ denotes the set of positive integers. Preferably, the measurements are available for each antenna branch.

Computed load factors $L_{own}(t)$, with a sampling rate of $T_L=k_L TTI$, $k_L \in Z+$. Preferably, load factors are available per cell and are valid on cell level. They need not necessarily be valid on antenna branch level with Rx diversity.

The loop delay $T_D$ between the calculation of $L_{own}(t)$, and the time it takes effect on the air interface. The loop delay may be dependent on the TTI. Preferably, the loop delay is available for and valid per cell.

Measured load factors $\overline{L}_{own}(t)$, with a sampling rate of $T_{\overline{L}}=k_{\overline{L}}TTI$, $k_{\overline{L}} \in Z+$. Preferably, the load factors are available per cell, and valid on the cell level. They need not necessarily be valid on the antenna branch level with Rx diversity. The factors can be obtained after TFCI (transport format combination indicator) decoding.

The loop delay $\overline{T}_D$ between the calculation of $\overline{L}_{own}(t)$, and the time it takes effect on the air interface. The loop delay can be dependent on the TTI and larger than $T_D$ since the measured load factor calculation may necessitate TFCI and E-TFCI (enhanced TFCI) decoding.

For adaptation to extended Kalman filtering, the following states are modeled:

$$x_1(t)=p_{load}(t)\text{-load utilization probability at time } t, \quad (12)$$

$$x_2(t)=P_{other}(t)+P_N(t)\text{-interference-and-noise sum at time } t, \quad (13)$$

$$x_3(t)=\Delta\overline{L}_{own}(t)\text{-load factor bias at time } t, \quad (14)$$

$$x_4(t)=x_1(t-T)\text{-decoding delay incorporated.} \quad (15)$$

Since an additional decoding delay affects the loop, the first state $x_1(t)$ should be delayed by an extra state to define the fact that the load utilization probability measurement is subject to an additional delay T for decoding. The fourth state $X_4(t)$ can be used for this purpose. The delay T can be any positive integer multiple of the TTI. Typically the delay T is substantially equal to one TTI. In the equations for the states, $\Delta L_{own}(t)$ represents a slowly varying load factor bias error in the measurement model.

If alternative "b" is used, then the estimated own cell load factor $L_{own}(t)$ may be introduced as the first state $X_1(t)$.

In the nonlinear model, various measurements can be made available for processing. First of these is the total wideband power $P_{RTWP}(t)$. Note that the scheduled load of the own cell $L_{own}(t)$ is a computed quantity (e.g., based on SINR measurements). For this reason, it is advantageous to provide a measurement model of $P_{RTWP}(t)$, expressed in terms of the states, computed quantities and a measurement uncertainty. Towards this end, first note that the load in equation (6) does not account for the load utilization probability $p_{load}(t)$. Also, it does not account for the delay $T_D$.

To model the load utilization effect, and to compensate for semi-constant load factor errors, a review of equation (5) suggests that load underutilization can be modeled by modifying equations (5) and (6) as:

$$L_{own,utilized}(t) = \qquad (16)$$
$$\sum_{i=1}^{I} p_{load}(t)L_i(t-T_D) + \Delta\overline{L}_{own}(t) = p_{load}(t)L_{own}(t-T_D) + \Delta\overline{L}_{own}(t),$$

$$P_{RTWP}(t) = L_{own,utilized}(t)P_{RTWP}(t) + P_{other}(t) + P_N(t) \qquad (17)$$

which results in $$P_{RTWP}(t) = \frac{1}{1 - L_{own}(t-T_D)p_{load}(t) + \Delta\overline{L}_{own}(t)}(P_{other}(t) + P_N(t)). \qquad (18)$$

After an addition of a zero mean white measurement noise $e_{RTWP}(t)$ and replacement of variables by the states (12)-(15), the following nonlinear measurement equations result:

$$y_{RTWP}(t) = \frac{x_2(t)}{1 - L_{own}(t-T_D)x_1(t) + x_3(t)} + e_{RTWP}(t), \qquad (19)$$

$$R_{2,RTWP}(t) = E[e_{RTWP}^2(t)]. \qquad (20)$$

In equations (19) and (20), $y_{RTWP}(t)=P_{RTWP}(t)$ and $R_{2,RTWP}(0$ denotes the (scalar) covariance matrix of $e_{RTWP}(t)$. If the load of the own cell is computed using both EUL and R99 traffic, the delay can be valid for both. If the own cell load is estimated instead, $L_{own}(t-T_D)x_1(t)$ in equation (19) can be expressed by a state directly modeling the estimated load factor of the own cell. The own cell load factor appearing in equation (19) can be treated as a known time varying factor, not as an estimate.

Note that equation (19) can represent a nonlinear load curve, expressed in terms of an estimate of the load utilization probability $x_1(t)=\hat{p}_{load}(t)$, an estimate of the interference-and-noise sum $x_2(t)=\hat{P}_{other}(t)+\hat{P}_N(t)$ and an estimate of the load factor bias $x_3(t)=\Delta\hat{L}_{own}(t)$. That is, equation (19) can represent a nonlinear curve expressed in terms of $\hat{x}_1(t)$, $\hat{x}_2(t)$ and $\hat{x}_3(t)$. Further, the computed or received load factor can be used in the nonlinear load curve. Then equation (19) can be said to relate the momentary combined effect of the estimated quantities and received quantities to the left hand side of the equation, i.e., the momentary measurement of the wideband power. Note that in one or more embodiments, the thermal noise floor N(t) can be used to represent the thermal noise $P_N(t)$ and the thermal noise floor estimate $\hat{N}(t)$ can be used to represent thermal noise estimate $\hat{P}_N(t)$ in these equations.

Measurement of the load utilization probability $p_{load}(t)$ can be made available per cell. As an example, the decoded TFCIs (transport format combination indicator) and E-TFCISs (enhanced TFCI) show which grants the wireless terminal 430 actually used in the last TTI. This provides the information needed to compute the used load factor $\bar{L}_{own}(t)$ of the last TTI, and thus to compute:

$$p_{load}(t) = \frac{\bar{L}_{own}(t-T_D)}{L_{own}(t-T_D)}. \tag{21}$$

With such modification, the measurement model for the load utilization probability measurement becomes:

$$y_{loadUtilization}(t) = x_4(t) + e_{loadUtilization}(t), \tag{22}$$

$$R_{2,loadUtilization}(t) = E[e_{loadUtilization}(t)]^2. \tag{23}$$

The transformation equation (21) can be viewed as essentially replacing the granted load factor, $L_{own}(t-T_D)$, with the load factor computed based on the received TFCIs and E-TFCIs, In the dynamic state model, random walk models can be adapted for the first and second state variables $x_1(t)$ and $x_2(t)$. To avoid a drifting bias correction of the load factor, an autoregressive model can be used for the third state $x_3(t)$. A further motivation for this is that the state can be expected to model errors that over an ensemble have a zero mean. Hence the following state model can result from the states of (12)-(15).

$$x(t+T_{TTI}) \equiv \begin{pmatrix} x_1(t+T) \\ x_2(t+T) \\ x_3(t+T) \\ x_4(t+T) \end{pmatrix} = \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix} \tag{24}$$

$$R_1(t) = E\left[\begin{pmatrix} w_1(t) \\ w_2(t) \\ w_3(t) \\ w_4(t) \end{pmatrix} \begin{pmatrix} w_1(t) & w_2(t) & w_4(t) & w_4(t) \end{pmatrix}\right]. \tag{25}$$

Preferably, the delay T equals one TTI, but can be any positive integer multiple of the TTI. Note that by setting a=1, a random walk model can be obtained for all states. A diagonal covariance matrix can be used. The last component of the system noise is preferably selected to be very small, reflecting the pure delay it is intended to model.

A general state space model behind the EKF (Extended Kalman Filter) can be expressed as follows:

$$x(t+T) = A(t)x(t) + B(t)u(t) + w(t). \tag{26}$$

$$y(t) = c(x(t)) + e(t). \tag{27}$$

In these vector equations, x(t) denotes a state vector, u(t) denotes an input vector (not used in this particular instance), y(t) denotes an output measurement vector comprising power measurements performed in a cell, w(t) denotes the so called systems noise that represents the model error, and e(t) denotes the measurement error. The matrix A(t) is a system matrix describing the dynamic modes, the matrix B(t) is the input gain matrix, and the vector c(x(t)) is the measurement vector which is a function of the states, possibly nonlinear, of the system. Finally, t represents the time and T represents the sampling period.

The general case with a nonlinear measurement vector is considered here. For this reason, the EKF is applied. This filter is given by the following matrix and vector iterations.

Initialization: (28)

$t = t_0$ $\hat{x}(0 \mid -1) = x_0$ $P(0 \mid -1) = P_0$

Iteration $t = t + T$ $C(t) = \left.\frac{\partial c(x)}{\partial x}\right|_{x=\hat{x}(t\mid t-T)}$ $\hat{x}(t \mid t) = \hat{x}(t \mid t-T) + K_f(t)(y(t) - c(\hat{x}(t \mid t-T)))$ $P(t \mid t) = P(t \mid t-T) - K_f(t)C(t)P(t \mid t-T)$ $\hat{x}(t+T \mid t) = A\hat{x}(t \mid t) + Bu(t)$ $P(t+T \mid t) = AP(t \mid t)A^T + R_1.$ End The quantities introduced in the filter iterations (28) are different types of estimates ($\hat{x}(t|t-T)$, $\hat{x}(t|t)$, P(t|t-T), and P(t|t)), function of such estimates (C(t) and $K_f(t)$), or other quantities ($R_2(t)$ and $R_1(t)$), defined as follows:

$\hat{x}(t|t-T)$ denotes a state prediction, based on data up to time t−T, $\hat{x}(t|t)$ denotes a filter update, based on data up to time t, P(t|t−T) denotes a covariance matrix of the state prediction, based on data up to time t−T, P(t|t) denotes a covariance matrix of the filter update, based on data up to time t, C(t) denotes a linearized measurement matrix (linearization around the most current state prediction), $K_f(t)$ denotes a time variable Kalman gain matrix, $R_2(t)$ denotes a measurement covariance matrix, and $R_1(t)$ denotes a system noise covariance matrix.

Note that $R_1(t)$ and $R_2(t)$ are often used as tuning variables of the filter. In principle, the bandwidth of the filter can be controlled by the matrix quotient of $R_1(t)$ and $R_2(t)$.

An example of the estimation scheme using EKF will be described. The quantities of the EKF for estimation of the other cell interference and the load utilization load factor bias can now be defined. Using equations (19)-(20) and (22)-(25) and (28) it follows that:

$$C(t) = \begin{pmatrix} C_{11}(t) & C_{12}(t) & C_{13}(t) & 0 \\ 0 & 0 & 0 & C_{24}(t) \end{pmatrix} \quad (29)$$

$$C_{11}(t) = \frac{L_{own}(t - T_D)\hat{x}_2(t \mid t - T)}{(1 - L_{own}(t - T_D)\hat{x}_1(t \mid t - T) + \hat{x}_3(t \mid t - T))^2} \quad (30)$$

$$C_{12}(t) = \frac{1}{1 - L_{own}(t - T_D)\hat{x}_1(t \mid t - T) + \hat{x}_3(t \mid t - T)} \quad (31)$$

$$C_{13}(t) = -\frac{\hat{x}_2(t \mid t - T)}{(1 - L_{own}(t - T_D)\hat{x}_1(t \mid t - T) + \hat{x}_3(t \mid t - T))^2} \quad (32)$$

$$C_{24}(t) = 1 \quad (33)$$

$$R_2(t) = E\left[ \begin{pmatrix} e_{RTWP}(t) \\ e_{loadUtilization}(t) \end{pmatrix} \begin{pmatrix} e_{RTWP}(t) & e_{loadUtilization}(t) \end{pmatrix} \right] \begin{pmatrix} R_{2,11}(t) & R_{2,12}(t) \\ R_{2,12}(t) & R_{2,22}(t) \end{pmatrix} \quad (34)$$

$$c(\hat{x}(t \mid t - T_{TTI})) = \begin{pmatrix} \frac{\hat{x}_2(t \mid t - T)}{1 - L_{own}(t - T_D)\hat{x}_1(t \mid t - T) + \hat{x}_3(t \mid t - T)} \\ \hat{x}_4(t \mid t - T) \end{pmatrix} \quad (35)$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \quad (36)$$

$$B = 0 \quad (37)$$

$$R_1(t) = E\left[ \begin{pmatrix} w_1(t) \\ w_2(t) \\ w_3(t) \\ w_4(t) \end{pmatrix} \begin{pmatrix} w_1(t) & w_2(t) & w_3(t) & w_4(t) \end{pmatrix} \right]$$

$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}. \quad (38)$$

To execute the EKF, the state prediction and the state covariance prediction applicable at time t are needed, they are given by the following equations:

$$\hat{x}(t \mid t - T_{TTI}) = \begin{pmatrix} \hat{x}_1(t \mid t - T) \\ \hat{x}_2(t \mid t - T) \\ \hat{x}_3(t \mid t - T) \\ \hat{x}_4(t \mid t - T) \end{pmatrix} \quad (39)$$

$$P(t \mid t - T_{TTI}) = \begin{pmatrix} P_{11}(t \mid t - T) & P_{12}(t \mid t - T) & P_{13}(t \mid t - T) & P_{14}(t \mid t - T) \\ P_{12}(t \mid t - T) & P_{22}(t \mid t - T) & P_{23}(t \mid t - T) & P_{24}(t \mid t - T) \\ P_{13}(t \mid t - T) & P_{23}(t \mid t - T) & P_{33}(t \mid t - T) & P_{34}(t \mid t - T) \\ P_{14}(t \mid t - T) & P_{24}(t \mid t - T) & P_{34}(t \mid t - T) & P_{44}(t \mid t - T) \end{pmatrix}. \quad (40)$$

Equations (29)-(40) define the EKF completely, when inserted in (28). The final step to compute the other cell interference estimate can be:

$$\hat{P}_{other}(t \mid t) = \hat{x}(t \mid t) - \hat{P}_N(t \mid t). \quad (41)$$

Figure 7:
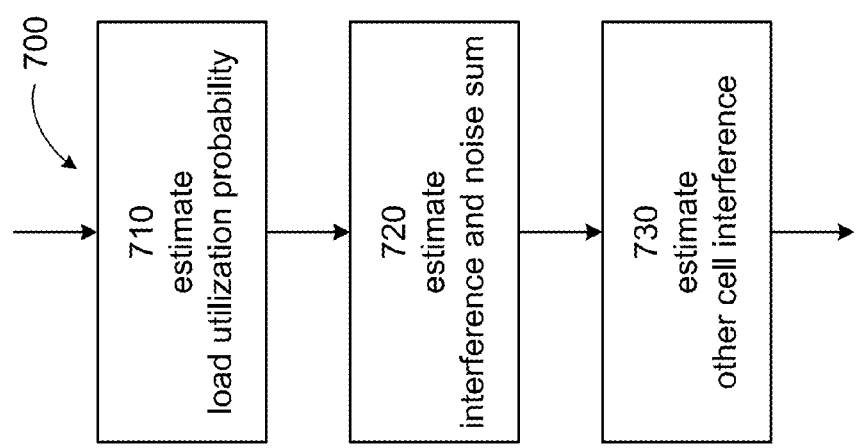
FIG. 7 illustrates a flow chart of example method performed by a radio network node to determine an other cell interference.

FIG. 7 illustrates a flow chart of example method 700 performed by a radio network node 410 to implement a high performing estimator. In particular, the method may be performed by an other cell interference estimator 1510, 1710 (see FIGS. 15, 17) to determine the other cell interference $P_{other}(t)$. In particular, the other cell interference estimate $\hat{P}_{other}(t)$ can be determined. The other cell interference $P_{other}(t)$ can represent a sum of interferences present in the cell of interest 420 due to wireless activities applicable at the time t in one or more cells other than in the cell of interest.

As illustrated, in step 710, the radio network node 410 can estimate the load utilization probability $p_{load}(t_1)$ to obtain a load utilization probability estimate $\hat{p}_{load}(t_1)$ applicable at time $t=t_1$. The estimation can be made based on at least on a load utilization probability $P_{load}(t_0)$ (or an estimate thereof) and an interference-and-noise sum $P_{other}(t_0)+P_N(t_0)$ (or an estimate thereof) applicable at time $t=t_0$.

Times $t_0$ and $t_1$ are assumed such that $t_1-t_0=T>0$. T can represent a duration between estimation times. In an embodiment, T is a positive integer multiple of a TTI (transmission time interval), preferably one (e.g., for 10 ms Tri) but can be larger (e.g., 5 for 2 ms TTI). In the method 700, it can be assumed the values of the quantities at time $t=t_0$ are known (measured, computed, received, or otherwise deterministic), and the values of one or more quantities at time $t=t_1$ are estimated or otherwise predicted.

Then step 710 may be rephrased as follows. Based on the values of the load utilization probability $p_{load}(t)$ and the interference-and-noise sum $P_{other}(t)+P_N(t)$ (or estimates thereof) that were known to be applicable at time $t=t_0$, the load utilization probability $p_{load}(t)$ applicable at time $t=t_1$ is predicted. The load utilization probability estimate $\hat{p}_{load}(t_1)$ represents the predicted value of the load utilization probability $p_{load}(t)$ at time $t=t_1$.

Figure 8:
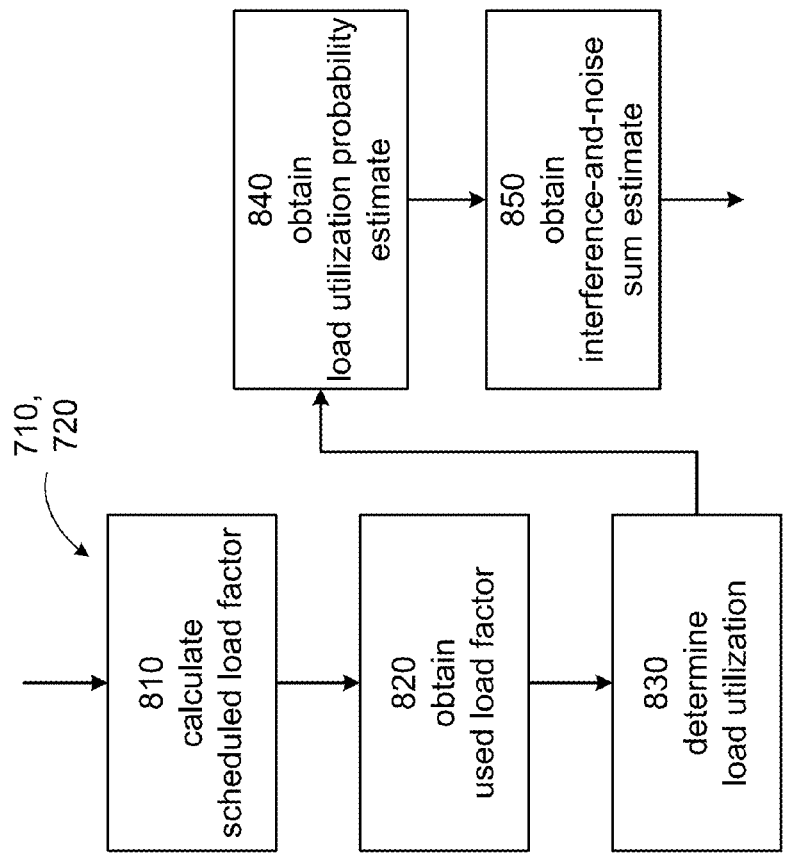
FIG. 8 illustrates a flow chart of an example process performed by a radio network node to estimate the load utilization probability and to estimate the interference-and-noise sum.

In step 720, the radio network node 410 can estimate the interference-and-noise sum $P_{other}(t_1)+P_N(t_1)$, i.e., determine the interference-and-noise sum estimate $\hat{P}_{other}(t_1)+\hat{P}_N(t_1)$ applicable at time $t=t_1$. This estimation can be made based at least on the load utilization probability $P_{load}(t_0)$ (or the estimate thereof) and the interference-and-noise sum $P_{other}(t_0)+P_N(t_0)$ (or the estimate thereof). Again, it can be said that based on the values of the values of load utilization probability $p_{load}(t)$ and the interference-and-noise sum $P_{other}(t)+P_N(t)$ (or estimates thereof) known to be applicable at time $t=t_0$, the interference-and-noise sum $P_{other}(t)+P_N(t)$ applicable at time $t=t_1$ is predicted, and the predicted value is represented by the interference-and-noise sum estimate $\hat{P}_{other}(t_1)+\hat{P}_N(t_1)$ FIG. 8 illustrates a flow chart of an example process performed by the radio network node 410 to implement the steps 710 and 720 to obtain the load utilization probability estimate $\hat{p}_{load}(t_1)$ and to obtain the interference-and-noise sum estimate $\hat{P}_{other}(t_1)+\hat{P}_N(t_1)$. In step 810, a scheduled load factor $L_{own}(t_1-T_D)$ can be calculated. Here, $T_D$ can represent a delay between the calculation of the scheduled load factor and a time the schedule takes effect on an air interface. The scheduled load factor $L_{own}(t-T_D)$ can express an amount of the radio resource grants scheduled to be used by the cell terminals 430 for uplink transmissions at the time t.

In step 820, a used load factor $\overline{L}_{own}(t_1-T_D)$ can be obtained. Note that the used load factor $\overline{L}_{own}(t-T_D)$ can express an amount of the scheduled radio resource grants used by the cell terminals 430 for the uplink transmissions at the time t.

In step 830, a load utilization $$\frac{\bar{L}_{own}(t_1 - T_D)}{L_{own}(t_1 - T_D)}$$

can be measured or otherwise determined. Based on the measured load utilization $$\frac{\bar{L}_{own}(t_1 - T_D)}{L_{own}(t_1 - T_D)},$$

the load utilization probability estimate $\hat{p}_{load}(t_1)$ can be obtained in step 840 and the interference-and-noise sum estimate $\hat{P}_{other}(t_1)+\hat{P}_N(t_1)$ can be obtained in step 850.

FIG. 9 illustrates a flow chart of another example process performed by the radio network node 410 to implement the steps 710 and 720 to obtain the load utilization probability estimate $\hat{p}_{load}(t_1)$ and to obtain the interference-and-noise sum estimate $\hat{P}_{other}(t_1)+\hat{P}_N(t_1)$. In step 910, a total wideband power $y_{RTWP}(t_1)$ can be measured. Based on the measured total wideband power $y_{RTWP}(t_1)$, the load utilization probability estimate $\hat{p}_{load}(t_1)$ can be obtained in step 920, and the interference-and-noise sum estimate $\hat{P}_{other}(t_1)+\hat{P}_N(t_1)$ can be obtained in step 930.

FIG. 10 illustrates a flow chart of an example process performed by the radio network node 410 to implement the step 930 to obtain the interference-and-noise sum estimate $\hat{P}_{other}(t_1)+\hat{P}_N(t_1)$. In step 1010, a gain factor $g(t_1)$ can be determined based on the load utilization probability estimate $\hat{p}_{load}(t_1)$ and the scheduled load factor $L_{own}(t_0)$. In step 1020, the measured total wideband power $y_{RTWP}(t_1)$ can be modeled as a combination of the interference-and-noise sum estimate $\hat{P}_{other}(t_1)+\hat{P}_N(t_1)$ weighted by the gain factor $g(t_1)$ and a measurement uncertainty $e_{RTWP}(t_1)$. Based on the measured total wideband power $y_{RTWP}(t_1)$ and the modeling thereof, the interference-and-noise sum estimate $\hat{P}_{other}(t_1)+\hat{P}_N(t_1)$ can be obtained.

Figure 11:
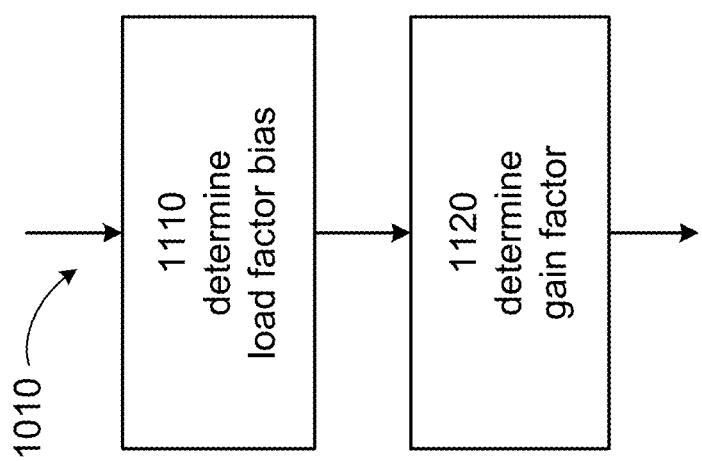
FIG. 11 illustrates a flow chart of an example process performed by a radio network node to determine a gain factor.

FIG. 11 illustrates a flow chart of an example process performed by the radio network node 410 to implement the step 1010 to determine the gain factor $g(t_1)$. In step 1110, a load factor bias $\Delta L_{own}(t_1)$ can be determined. The load factor bias $\Delta L_{own}(t)$ can express an error of the scheduled load factor $L_{own}(t)$. In step 1120, the gain factor $g(t_1)$ can be determined based at least on the load utilization probability estimate $\hat{p}_{load}(t_1)$ the scheduled load factor $L_{own}(t_0)$, and the load factor bias $\Delta L_{own}(t_1)$.

Referring back to FIG. 7, once the interference-and-noise sum estimate $\hat{P}_{other}(t_1)+\hat{P}_N(t_1)$ is determined in step 720, the radio network node 410 can estimate the other cell interference $P_{other}(t_1)$ to obtain the other cell interference estimate $\hat{P}_{other}(t_1)$ The estimation can be based at least on the interference-and-noise sum estimate $\hat{P}_{other}(t_1)+\hat{P}_N(t_1)$ and a thermal noise estimate $\hat{P}_N(t_1)$. Note that the interference-and-noise sum $P_{other}(t)+P_N(t)$ can express a sum of undesired signals, other than an own cell load $P_{own}(t)$. In FIG. 4, the interference-and-noise sum $P_{other}(t)+P_N(t)$ are visually illustrated with shaded arrows (from the other terminals 435) and the large white arrow.

Figure 12:
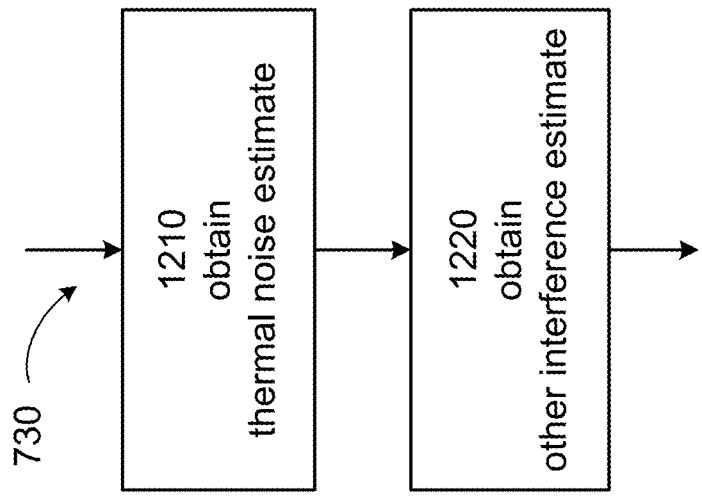
FIG. 12 illustrates a flow chart of an example process performed by a radio network node to determine an other cell interference estimate.
Figure 13:
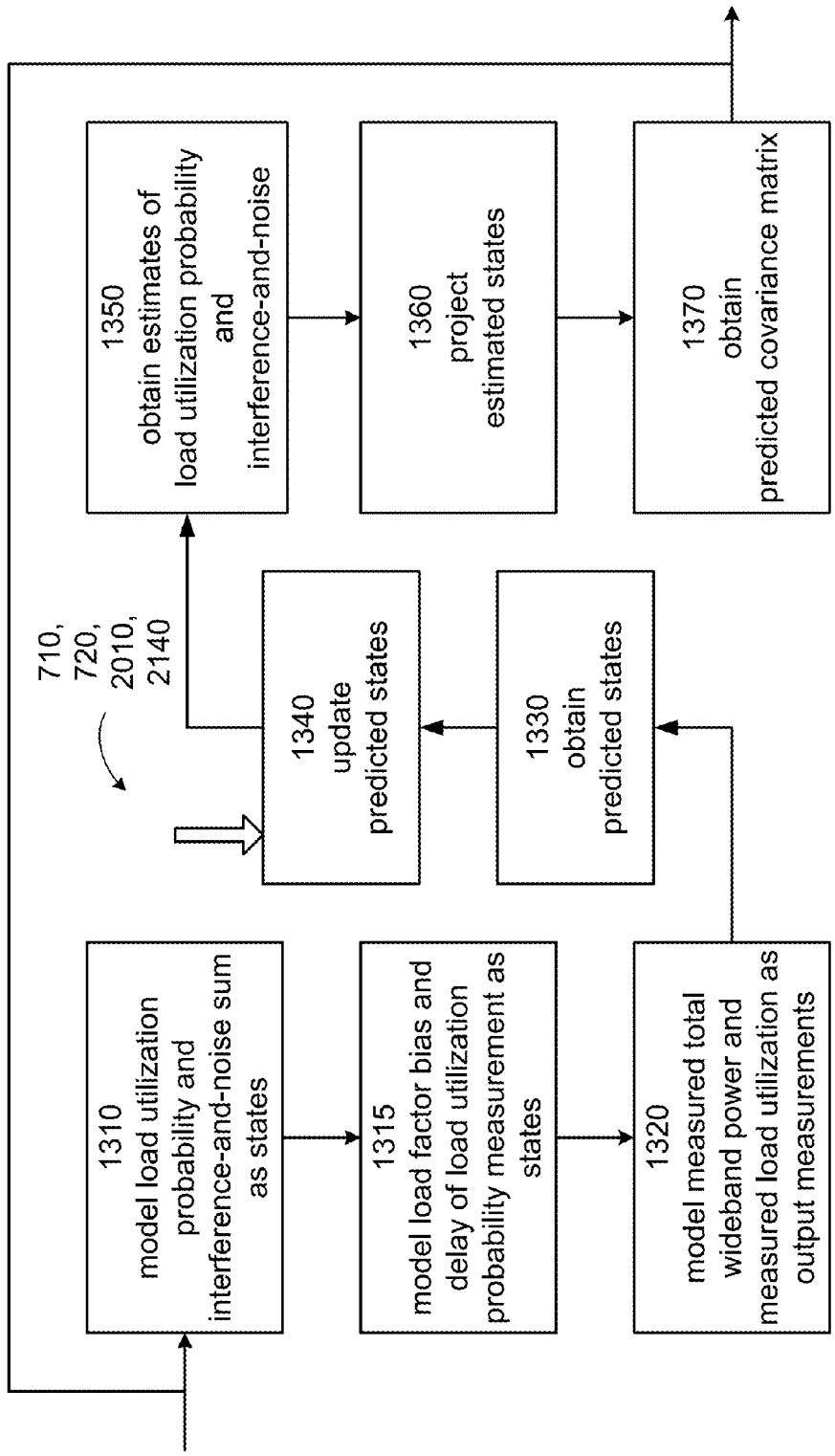
FIG. 13 illustrates a flow chart of yet another example process performed by a radio network node to estimate the load utilization probability and to estimate the interference-and-noise sum.

It can then be seen that once the interference-and-noise sum estimate $\hat{P}_{other}(t_1)+\hat{P}_N(t_1)$ is determined, the other cell interference estimate $\hat{P}_{other}(t)+\hat{P}_N(t)$ can be derived if the thermal noise estimate $\hat{P}_N(t)$ can be determined. FIG. 12 illustrates a flow chart of an example process performed by the radio network node 410 to implement the step 730 of estimating the other cell interference $P_{other}(t_1)$ In step 1210, the thermal noise estimate $\hat{P}_N(t_1)$ can be obtained. In one embodiment, a thermal noise floor estimate $\hat{N}(t_1)$ corresponding to the cell of interest 420 can be obtained as the thermal noise estimate $\hat{P}_N(t_1)$. In step 1220, thermal noise estimate $\hat{P}_N(t_1)$ can be subtracted from the interference-and-noise sum estimate $\hat{P}_{other}(t_1)+\hat{P}_N(t_1)$ to obtain the other cell interference estimate $\hat{P}_{other}(t_1)$ FIG. 13 illustrates another flow chart of an example process performed by the radio network node 410 to implement the steps 710 and 720 to obtain the load utilization probability estimate $\hat{p}_{load}(t_1)$ and to obtain the interference-and-noise sum estimate $\hat{P}_{other}(t_1)+\hat{P}_N(t_1)$ FIG. 13 may be viewed as a specific instance of the flow chart illustrated in FIG. 8. In FIG. 13, the extended Kalman filtering adapted for estimation is used.

In step 1310, the load utilization probability $p_{load}(t)$ and the interference-and-noise sum $P_{other}(t)+P_N(t)$ can be respectively modeled as first and second states $x_1(t)=p_{load}(t)$, $x_2(t)=P_{other}(t)+P_N(t)$ in a state vector $x(t)$ of a state space model.

In this context, the state space model can be characterized through equations $x(t+T)=A(t)x(t)+B(t)u(t)+w(t)$ and $y(t)=c(x(t))+e(t)$. In these equations, $x(t)$ represents the state vector, $u(t)$ represents an input vector, $y(t)$ represents the output measurement vector, $w(t)$ represents a model error vector, $e(t)$ represents a measurement error vector, $A(t)$ represents a system matrix describing dynamic modes of the system, $B(t)$ represents an input gain matrix, $c(x(t))$ represents a measurement vector which is a function of the states of the system, t represents the time and T represents a sampling period. Thus, it is seen that modeling errors and measurement errors are incorporated in the state space model.

In step 1320, the measured total wideband power $y_{RTWP}(t)$ and the measured load utilization $y_{loadUtilization}(t)$ can be modeled in the output measurement vector $y(t)$ of the state space model.

In step 1330, a predicted state vector $\hat{x}(t_1|t_0)$ can be obtained. The predicted state vector $\hat{x}(t_1|t_0)$ includes first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{other}(t_0)+\hat{P}_N(t_0)$ In this context, the predicted state vector $\hat{x}(t|t-T)$ denotes a prediction of the state vector $x(t)$ based on information available up to time $t-T$. Recall from above that $t_1-t_0=T>0$. Thus, the predicted state vector $\hat{x}(t_1|t_0)$ denotes a prediction the state vector $x(t)$ at time $t=t_1$ based on information available up to time $t=t_0$. The time $t=t_0$ can be a time of initialization or a time of a previous iteration.

In step 1340, the predicted state vector $\hat{x}(t_1|t_0)$ can be updated based on one or more measurements included in an output measurement vector $y(t_1)$ applicable at the time $t=t_1$ to obtain an estimated state vector $\hat{x}(t_1|t_1)=\hat{x}(t_1)$. The measurements can include the measured received total wideband power $y_{RTWP}(t_1)$ and the load utilization $y_{load}(t_1)$. The solid white arrow entering the step 1340 in FIG. 13 is to indicate that measurements may come into the step. Generally, the estimated state vector $\hat{x}(t|t)=\hat{x}(t)$ denotes an estimate of the state vector $x(t)$ based on information available up to time t. This step corresponds to an adjusting step of the Kalman filter algorithm in which the prediction made in the previous time (e.g., at time $t=t_0$) is adjusted according to measurements made in the current time (e.g., at time $t=t_1$).

In step 1350, first and second estimated states $\hat{x}_1(t_1)$, $\hat{x}_2(t_1)$ can be obtained from the estimated state vector $\hat{x}(t_1)$ respectively as the load utilization probability estimate $\hat{x}_1(t_1)=\hat{p}_{load}(t_1)$ and the interference-and-noise sum estimate $\hat{x}_2(t_1)=\hat{P}_{other}(t_1)+\hat{P}_N(t_1)$.

In step 1360, the estimated state vector $\hat{x}(t_1)$ is projected based at least on dynamic modes corresponding to the cell of interest to obtain a predicted state vector $\hat{x}(t_2|t_1)$, $t_2-t_1=T$. Here, the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-noise sum estimate $\hat{x}_2(t_1)=\hat{P}_{other}(t_1)+\hat{P}_N(t_1)$. This step corresponds to a predicting step of the Kalman filter algorithm in which future states are predicted based on current information. As seen, the steps in FIG. 13 can be iteratively performed.

In one embodiment, the steps 1340 and 1360 of updating the predicted state vector $\hat{x}(t_1|t_0)$ and of projecting the estimated state vector $\hat{x}(t_1|t_1)$ comprise performing a Kalman filter process to iteratively predict and update the state vector $x(t)$ to obtain the estimated state vector $\hat{x}(t)$. Here, the estimated state vector $\hat{x}(t)$ includes the first and second estimated states $\hat{x}_1(t)$ and $\hat{x}_2(t)$ corresponding to the load utilization probability estimate $\hat{p}_{load}(t)$ and the interference-and-noise sum estimate $\hat{P}_{other}(t)+\hat{P}_N(t)$.

In addition to the load utilization probability $p_{load}(t)$ and the interference-and-noise sum $P_{other}(t)+P_N(t)$ modeled as first and second states $x_1(t)=p_{load}(t)$, $x_2(t)=P_{other}(t)+P_N(t)$ in step 1310, third and fourth states $x_3(t)=\Delta L_{own}(t)$, $x_4(t)=x_1(t-T)$ may also be modeled in the state vector $x(t)$ of the state space model in step 1315. The third state $x_3(t)=\Delta L_{own}(t)$ can represent a load factor bias expressing an error of a scheduled load factor $L_{own}(t)$, and the fourth state $x_4(t)=x_1(t-T)$ can reflect that the load utilization probability measurement is subject to a delay corresponding to the sampling period T. The step 1315 need not be performed if the third and fourth states are not used, and therefore, can be considered as optional. However, the third and fourth states are preferred to be used.

Figure 14:
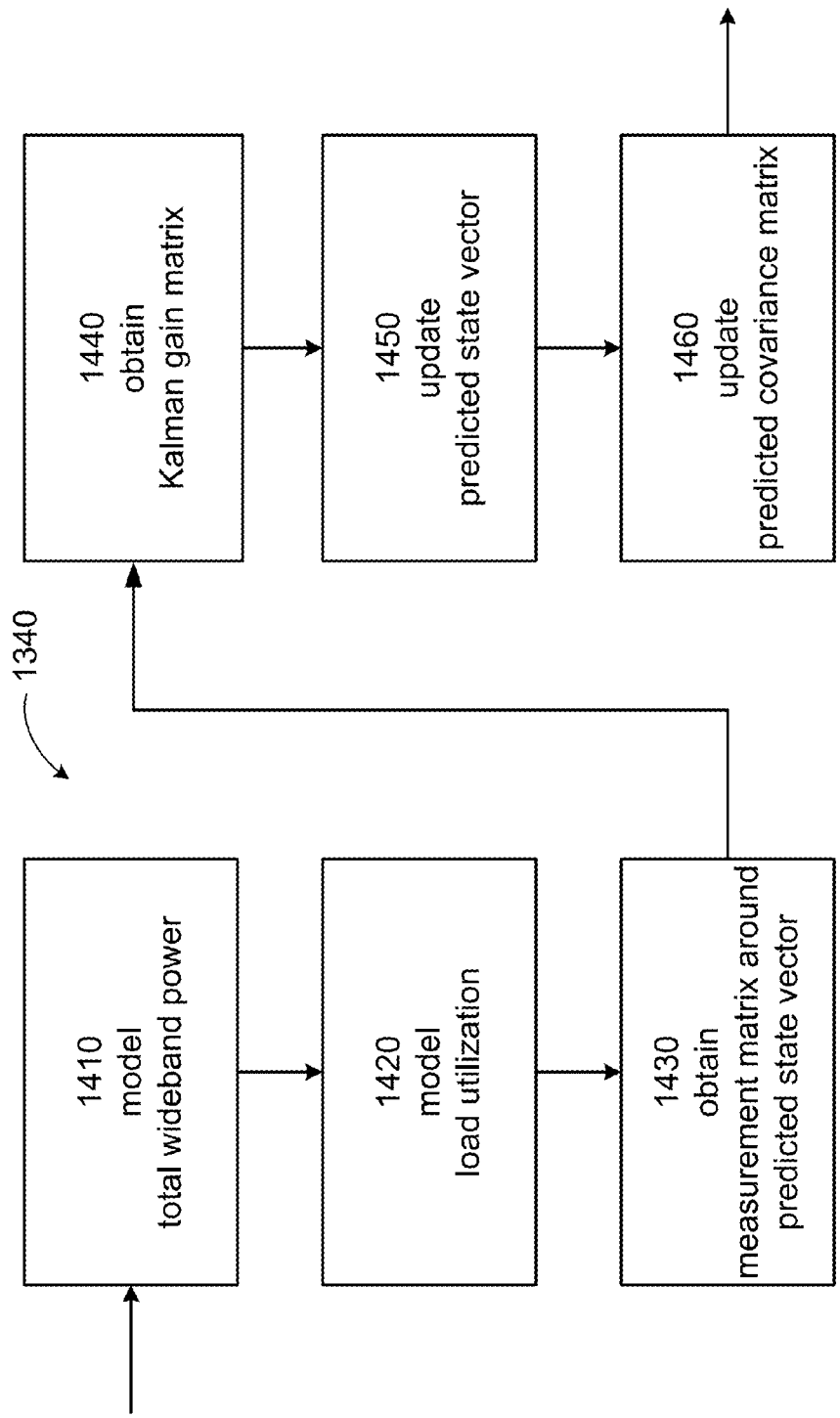
FIG. 14 illustrates a flow chart of an example process performed by a radio network node to perform a Kalman filter update of a predicted state vector.

FIG. 14 illustrates a flow chart of an example process performed by the radio network node 410 to implement the step 1340 to update predicted state vector $\hat{x}(t_1|t_0)$ when the third and fourth states are also modeled. In step 1410, the measured total wideband power $y_{RTWP}(t_1)$ applicable at the time $t=t_1$ can be modeled as:

$$y_{RTWP}(t_1) = \frac{x_2(t_1)}{1-L_{own}(t_1-T_D)x_1(t_1)+x_3(t_1)} + e_{RTWP}(t_1). \quad (42)$$

Here, $T_D$ can represent a delay between calculation of the schedule and a time the schedule takes effect on an air interface. Also, $e_{RTWP}(t)$ can represent a measurement error.

In step 1420, the load utilization $y_{loadUtilization}(t_1)$ applicable at the time $t=t_1$ as can be modeled as:

$$y_{loadUtilization}(t_1)=x_4(t_1)+e_{loadUtilization}(t_1). \quad (43)$$

Again, $e_{loadUtilization}(t)$ can represent a measurement error.

In step 1430, a measurement matrix $C(t_1)$ around the predicted state vector $\hat{x}(t_1|t_0)$ can be obtained. Here, the predicted state vector $\hat{x}(t_1|t_0)$ can include the first, second, third, and fourth predicted states $(t_1|t_0)$, $\hat{x}_2(t_1|t_0)$, $\hat{x}_3(t_1|t_0)$, $\hat{x}_4(t_1|t_0)$ which are predicted based on data up to the time $t=t_0$. In an embodiment, the measurement matrix $C(t_1)$ can be obtained by determining the measurement matrix $C(t_1)$ linearized around the predicted state vector $\hat{x}(t_1|t_0)$ such that $$C(t) = \frac{\partial c(x)}{\partial x}\bigg|_{x=\hat{x}(t_1|t_0)}.$$

In step 1440, a Kalman gain matrix $K_f(t_1)$ can be obtained based on at least the measurement matrix $C(t_1)$, the measurement error vector $e(t_1)$, and a predicted covariance matrix $P(t_1|t_0)$ corresponding to the predicted state vector $\hat{x}(t_1|t_0)$. In an embodiment, the Kalman gain matrix $K_f(t_1)$ can be obtained by determining:

$$K_f(t_1)=P(t_1|t_0)C_T(t_1)(C(t_1)P(t_1|t_0)C_T(t_1)+R_2(t_1))^{-1} \quad (44)$$

in which $C^T(t)$ is a transpose of the measurement matrix $C(t)$ and $(R_2(t))$ is a measurement covariance matrix corresponding to the measurement error vector $e(t)$.

In step 1450, the predicted state vector $\hat{x}(t_1|t_0)$ can be updated based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$. The estimated state vector $\hat{x}(t_1)$ can include the first, second, third, and fourth estimated states $\hat{x}_1(t_1)$, $\hat{x}_2(t_1)$, $\hat{x}_3(t_1)$, $\hat{x}_4(t_1)$. In an embodiment, the estimated state vector $\hat{x}(t_1|t_1)=\hat{x}(t_1)$ can be obtained through determining:

$$\hat{x}(t_1|t_1)=\hat{x}(t_1|t_0)+K_f(t_1)(y(t_1)-c(\hat{x}(t_1|t_0))). \quad (45)$$

Here $y(t_1)$ is the measurement vector, with components being the received total wideband power measurement and the load utilization measurement.

In step 1460, the predicted covariance matrix $P(t_1|t_0)$ can be updated based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$. In an embodiment, the updated covariance matrix $P(t_1|t_1)$ can be obtained through determining:

$$P(t_1|t_1)=P(t_1|t_0)-K_f(t_1)C(t_1)P(t_1|t_0). \quad (46)$$

Referring back to FIG. 13, when there are first through fourth states, the step 1360 of projecting the estimated state vector $\hat{x}(t_1)$ can comprise projecting the estimated state vector $\hat{x}(t_1)$ based on at least the system matrix $A(t_1)$ to obtain the predicted state vector $\hat{x}(t_2|t_1)$. Here, the predicted state vector $\hat{x}(t_2|t_1)$ includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$. Then in step 1370, the updated covariance matrix $P(t_1|t_1)$ can be projected to obtain a predicted covariance matrix $P(t_2|t_1)$ based on at least the system matrix $A(t_1)$ and a system noise covariance matrix $R_1(t_1)$. Back in step 1360, the predicted state vector $\hat{x}(t_2|t_1)$ can be obtained by determining $\hat{x}(t_2|t_1)=A\hat{x}(t_1|t_1)+Bu(t_1)$, and in step 1370, the predicted covariance matrix $P(t_2|t_1)$ can be obtained through determining $P(t_2|t_1)=AP(t_1|t_1)A^T+R_1(t_1)$ in which $A^T$ is a transpose of the system matrix $A(t)$. Note that the input gain matrix $B(t)$ can be set to zero.

A MATLAB® (registered mark of MathWorks) code implementing the disclosed estimation algorithm was used to perform simulations. Each run was 720000 10 ms TTIs, i.e., 2 h of traffic. The load utilization probability was varied. The variation was very fast with changes every few TTIs. The mean power levels of the neighbor cell interference and the own cell were also varied between simulations, as was the load factor bias.

Repeated simulations were then used to characterize the estimator performance. The simulations results indicate that the accuracy of the estimator is good, particularly in the regions where the other cell interference is high and when it is affecting performance (well above the thermal noise power floor, and when it is large as compared to the own cell power). This holds up to interference levels of about 10 dB mean RoT.

It should be noted that mean RoTs above 10 dB represent a very high load, with RoT peaks at least at 20-25 dB. Hence the results indicate that the estimator should be capable of providing useful estimates in the majority of the interference region of interest.

Figure 18:
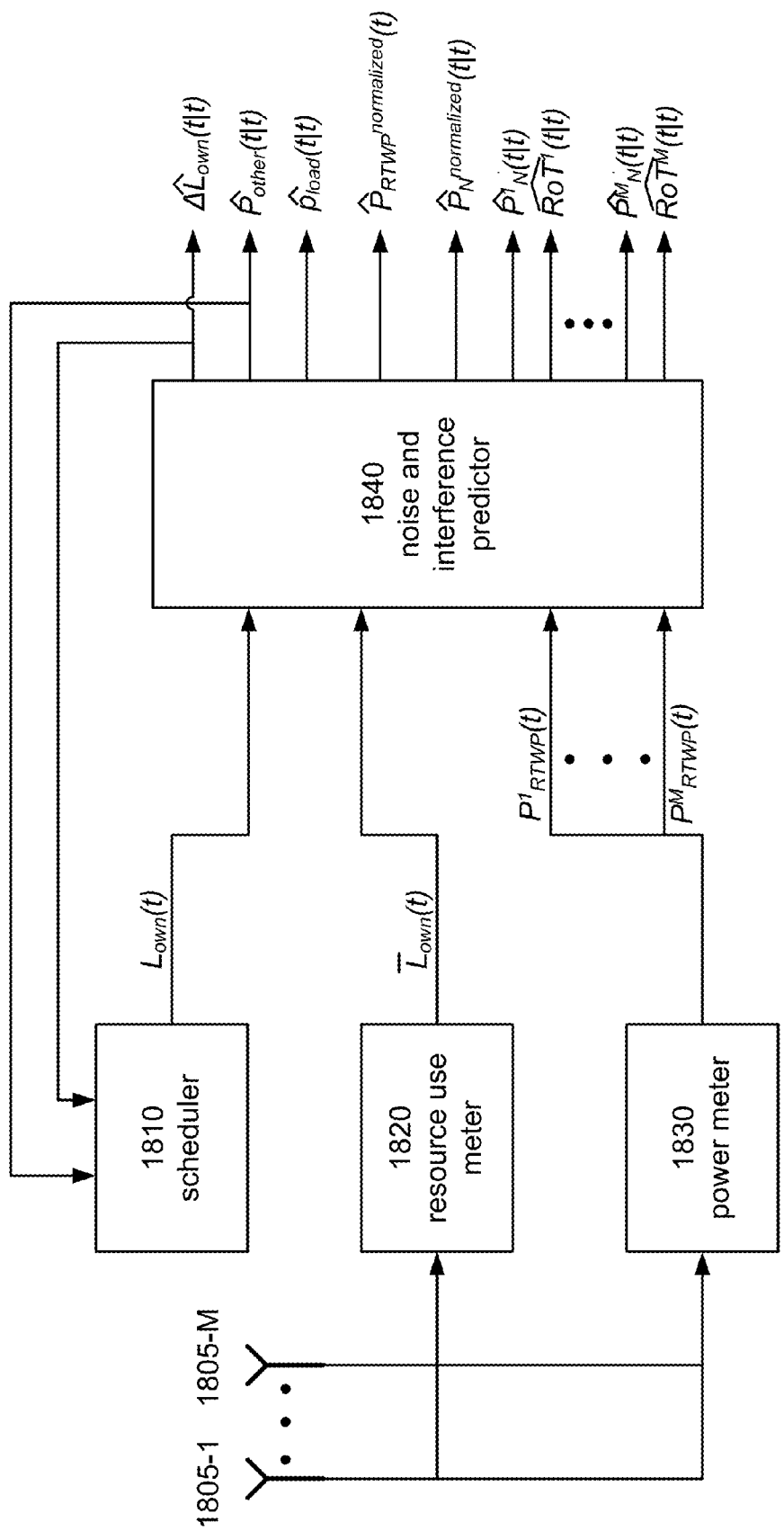
FIG. 18 illustrates another example embodiment of a radio network node.

FIG. 18 illustrates another example embodiment of a radio network node 410. As seen, the radio network node 410 may comprise a scheduler 1810, a resource use meter 1820, a power meter 1830 and a noise and interference predictor 1840. The scheduler 1810 may be structured to schedule resource grants, e.g., determine the scheduled load factor $L_{own}(t)$, and the resource use meter 1820 may be structured to determine the used load factor $\overline{L}_{own}(t)$. For example, the resource use meter 1820 may be a TFCI decoder or an E-TFCI decoder that determines the grants used by the UEs from measurements taken at each antenna branch 1805-$m$, $m = 1 \ldots M$, where M is an integer and represents the total number of antenna branches 1805 in the radio network node 410.

The power meter 1830 may be structured to determine the total wideband power $P_{RTWP}{}^m(t)$ also from measurements taken at each antenna branch 1805-$m$. The noise and interference predictor 1840 may be structured to determine the other cell interference estimate $\hat{P}_{other}(t|t)$, the load utilization probability estimate $\hat{p}_{load}(t|t)$, the thermal noise estimate $\hat{P}_N(t|t)$, the rise-over-thermal estimate $\hat{R}oT(t|t)$ and optionally the load factor bias estimate $\Delta\hat{L}_{own}(t|t)$ based on the outputs of the scheduler 1810, the resource use meter 1820, and the power meter 1830. The other cell interference estimate $\hat{P}_{other}(t|t)$ may be provided as a feedback to the scheduler 1810. If the load factor bias estimate $\Delta\hat{L}_{own}(t|t)$ is available, it may also be fed back to the scheduler 1810.

In one aspect, it can be assumed that $L_{own}(t)$, $\overline{L}_{own}(t)$ and $P_{RTWP}(t)$ represent known parameter values (e.g., measured, received, deterministically computed based on measured and/or received values), and the parameters $\hat{P}_{other}(t|t)$, $\hat{p}_{load}(t|t)$, $\hat{P}_N(t|t)$, $\hat{R}oT(t|t)$, and $\Delta\hat{L}_{own}(t|t)$ represent predicted/updated parameter values.

For example, assume that the scheduler 1810 schedules resource grants for use at time $t=t_0$ and measurements at the antenna branch 1805 are taken at the time $t=t_0$. Under this assumption, the parameter values $L_{own}(t)$, $\overline{L}_{own}(t)$ and $P_{RTWP}(t)$ are known to be applicable at the time $t=t_0$. Based on the known parameter values, the noise and interference predictor 1840 can predict and update the values of parameters $P_{other}(t)$, $p_{load}(t)$, $\Delta L_{own}(t)$, $P_N(t)$ and RoT(t) applicable at time $t=t_1$, where $t_1$ is a future time relative to time $t_0$, i.e., $t_1-t_0=T>0$. To state this in another way, based on the scheduled load factor $L_{own}(t_0)$, the used load factor $\overline{L}_{own}(t_0)$, and the total wideband power $P_{RTWP}(t_0)$, the noise and interference predictor 1840 can determine the other cell interference estimate $\hat{P}_{other}(t_1)$, the load utilization probability estimate $\hat{p}_{load}(t_1)$, the load factor bias estimate $\Delta\hat{L}_{own}(t_1)$, the thermal noise estimate $\hat{P}_N(t_1)$ and the rise-over-thermal estimate $\hat{R}oT(t_1)$.

Figure 15:
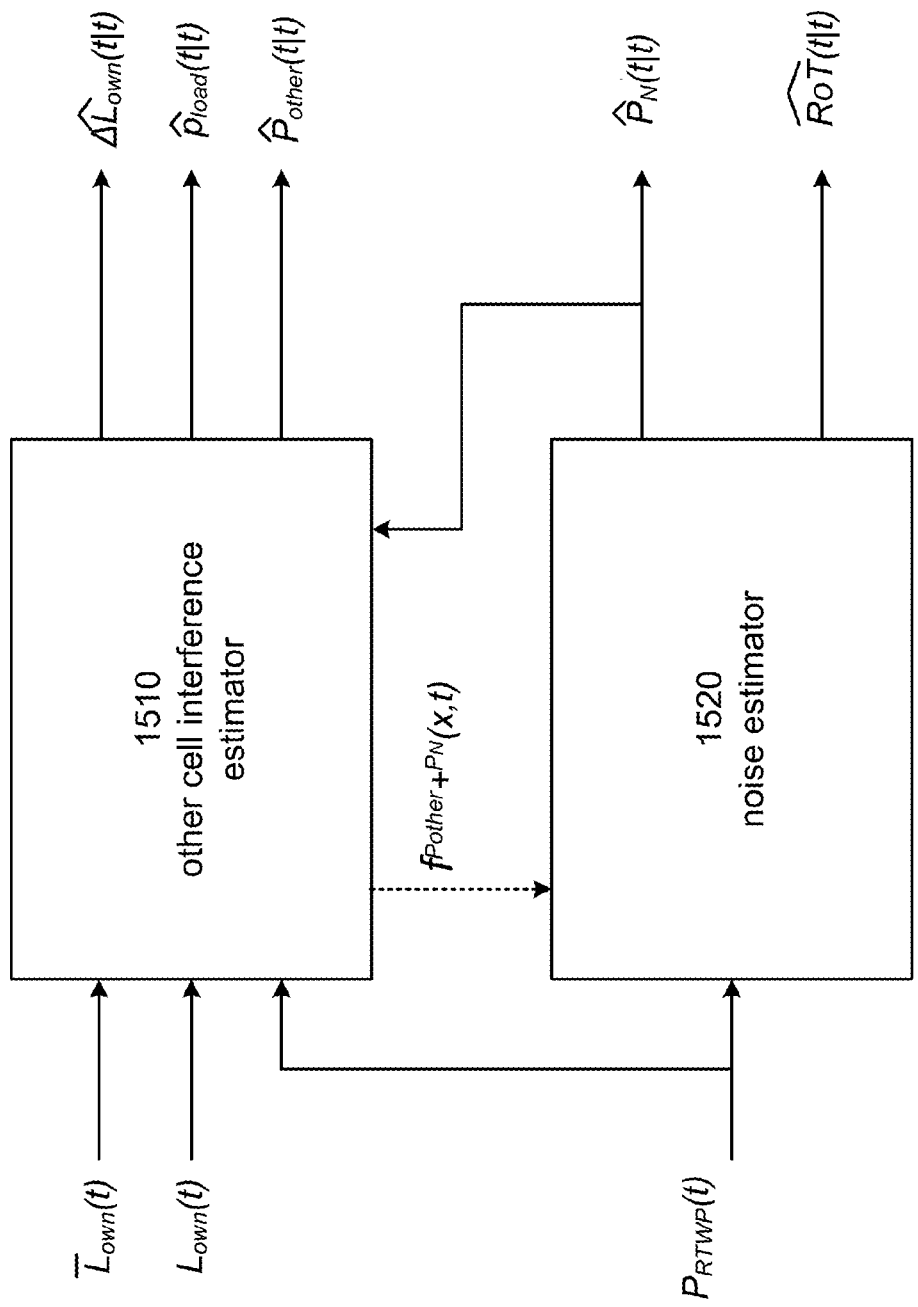
FIG. 15 illustrates an example embodiment of a noise and interference predictor.
Figure 16:
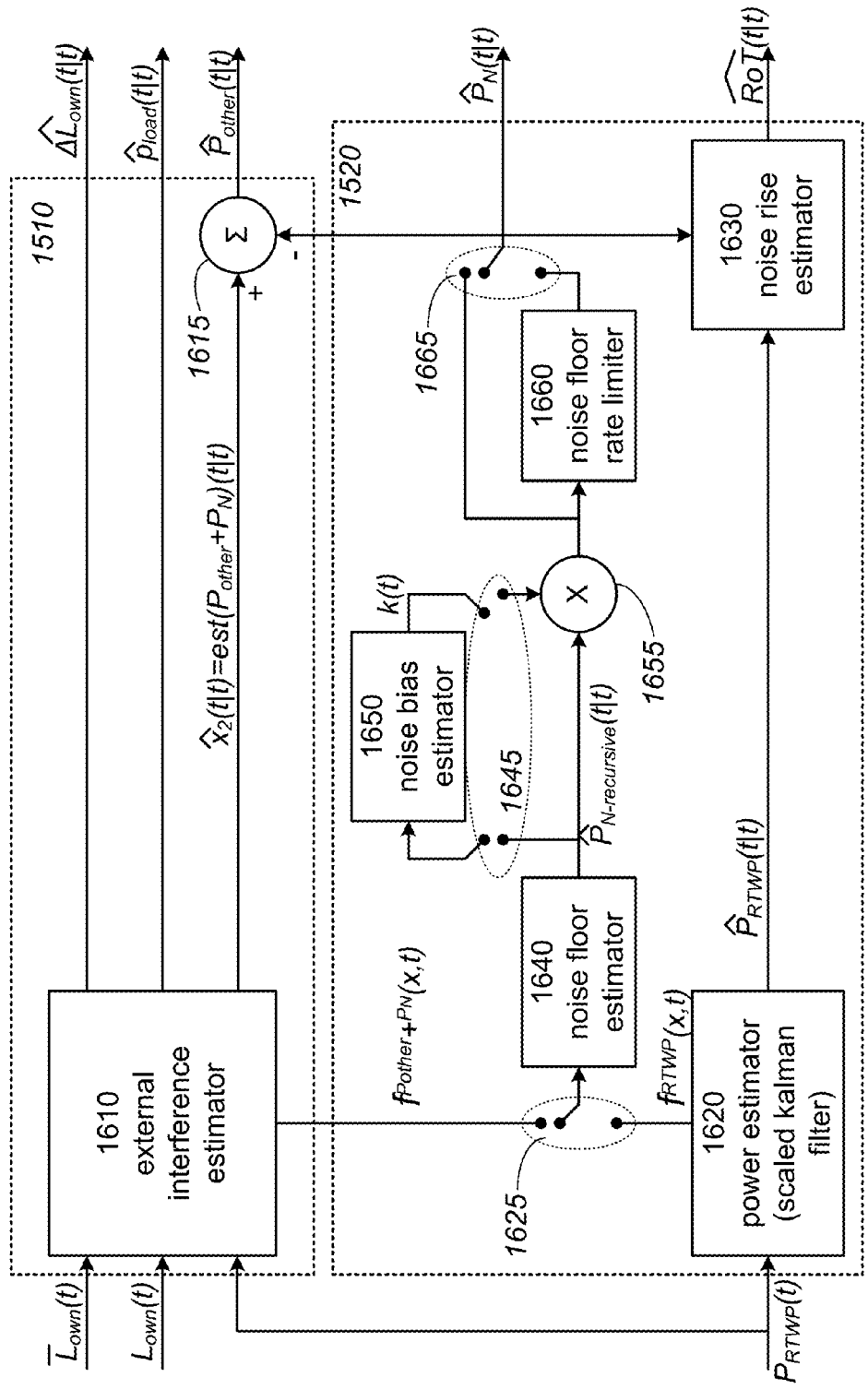
FIG. 16 illustrates example embodiments of the other cell interference estimator and a noise estimator.
Figure 17:
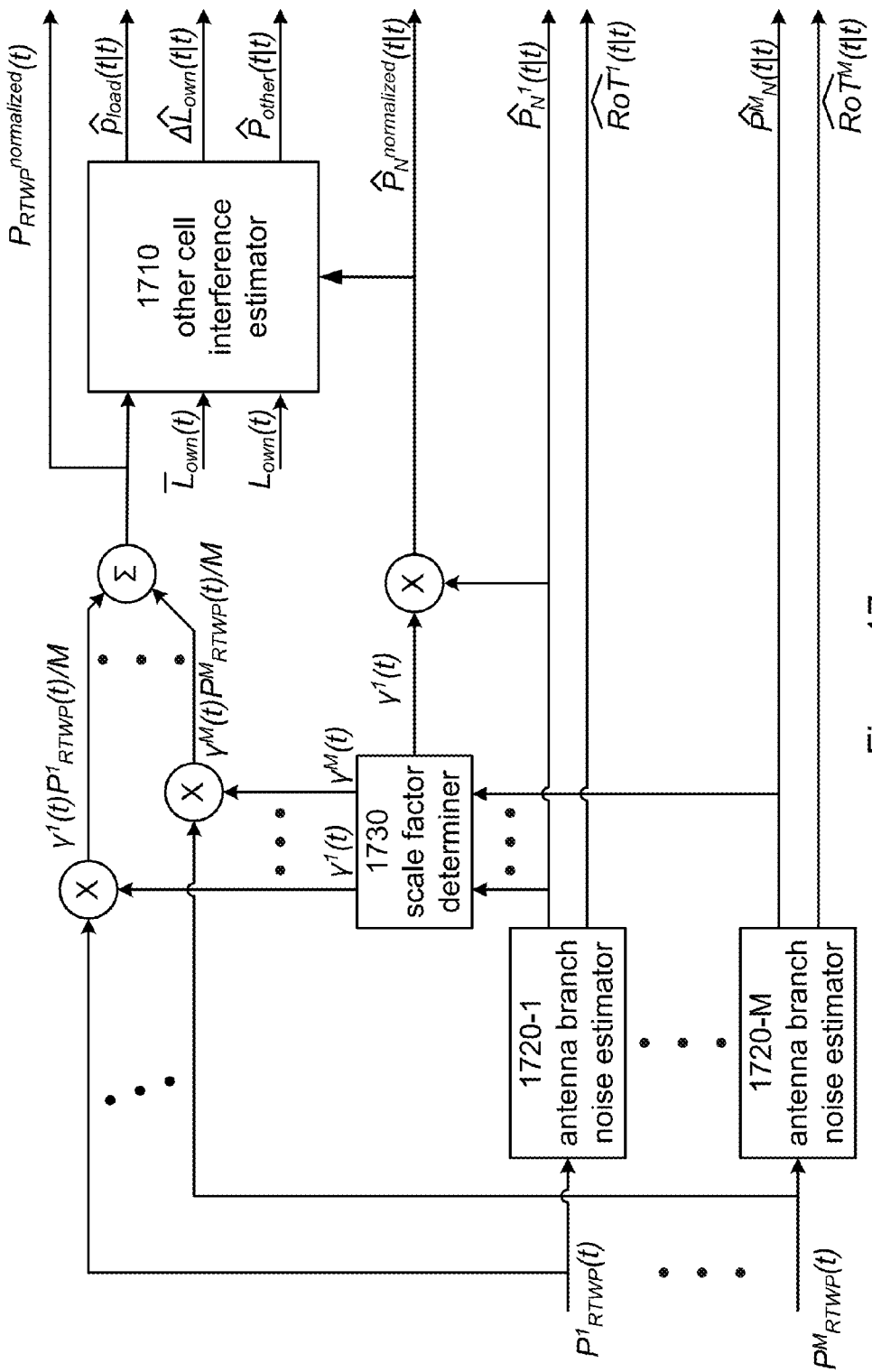
FIG. 17 illustrates another example embodiment of a noise and interference predictor.

In FIG. 18 as well as in FIGS. 15-17, each parameter is followed by a parenthetical "(t)" (e.g., $L_{own}(t)$) may be assumed to a known parameter value, and that a parameter followed by a parenthetical "(t|t)" (e.g., $\hat{R}oT(t|t)$)) may be assumed to be an estimated parameter value, i.e., an updated prediction of the parameter. Such parentheticals are consistent with the notations used in Kalman filtering. However, to enable easier understanding, "(t)" will be replaced with "($t_0$)" and "(t|t)" will be replaced with "($t_1$)" when appropriate.

FIG. 15 illustrates an example embodiment of the noise and interference predictor 1840. As seen the example noise and interference predictor 1840 comprises an other cell interference estimator 1510 and a noise estimator 1520. In FIG. 15, it is assumed that there is one antenna branch. Thus, the resource usage meter 1810 determines the used load factor $\overline{L}_{own}(t_0)$ based on the measurement at a single antenna branch 1805. Likewise, the power meter 1830 determines the total wideband power $P_{RTWP}(t_0)$ also based on the measurement at the antenna branch 1805.

The other cell interference estimator 1510 may be structured to determine the other cell interference estimate $\hat{P}_{other}(t_1)$ and the load utilization probability estimate $\hat{p}_{load}(t_1)$ based on the known parameters $L_{own}(t_0)$, $\overline{L}_{own}(t_0)$ and $P_{RTWP}(t_0)$. Optionally, the other cell interference estimator 1510 may also determine the load factor bias estimate $\Delta\hat{L}(t_1)$. The noise estimator 1520 may be structured to determine the thermal noise estimate $\hat{P}_N(t_1)$ and the rise-over-thermal estimate $\hat{R}oT(t_1)$ based on the known parameter $P_{RTWP}(t_0)$.

FIG. 16 illustrates example embodiments of the other cell interference estimator 1510 and the noise estimator 1520. As seen the other cell interference estimator 1510 may comprise an external interference estimator 1610 and a subtractor 1615. The external interference estimator 1610 may be configured to determine the interference-and-noise sum estimate $\hat{P}_{other}(t_1)+\hat{P}_N(t_1)$, the load utilization probability estimate $\hat{p}_{load}(t_1)$, and the load factor bias estimate $\Delta\hat{L}_{own}(t_1)$ based on the known scheduled load factor $L_{own}(t_0)$, the used load factor $\overline{L}_{own}(t_0)$ and the total wideband power $P_{RTWP}(t_0)$. An example of the external interference estimator 1610 is the extended Kalman filter described previously. The subtractor 1615 may be structured to subtract the thermal noise estimate $\hat{P}_N(t_1)$ from the interference-and-noise sum estimate $\hat{P}_{other}(t_1)+\hat{P}_N(t_1)$ to determine the other cell interference estimate $\hat{P}_{other}(t_1)$. The thermal noise estimate $\hat{P}_N(t_1)$ may be received from the noise estimator 1520.

The noise estimator 1520 can comprise a power estimator 1620, a noise rise estimator 1630, and a noise floor estimator 1640. The power estimator 1620 may be structured to output a total wide band power estimate $\hat{P}_{RTWP}(t_1)$ based on the known $P_{RTWP}(t_0)$. The power estimator 1620 may also output a conditional distribution $f^{RTWP}(x,t)$ of the total wideband power $P_{RTWP}(t_0)$. The conditional distribution $f^{RTWP}(x,t)$ can be used as an input to the noise floor estimator 1640, and is normally Gaussian, i.e. completely characterized by the mean value and the variance, as provided by the power estimator 1620. An example of the power estimator 1620 is a scaled Kalman filter as illustrated in FIG. 1.

The noise rise estimator 1630 may be structured to determine the rise-over-thermal estimate $\hat{R}oT(t_1)$ based on the total wide band power estimate $\hat{P}_{RTWP}(t_1)$ and the thermal noise estimate $\hat{P}_N(t_1)$.

The noise floor estimator 1640 may be structured to output a recursive thermal noise estimate $\hat{P}_{N\text{-}recursive}(t_1)$ based on either the conditional distribution $f^{RTWP}(x,t)$ or based on a conditional distribution $f^{other+N}(x,t)$ of the interference-and-noise sum $P_{other}(t)+P_N(t)$ provided from the external interference estimator 1610. The latter distribution is also typically at least approximately Gaussian, i.e. completely characterized by the mean value and the variance, as provided by the external interference estimator 1610. The noise floor estimator 1640 may be hardwired to receive one of the conditional distributions $f^{RTWP}(x,t)$ or $f^{other+N}(x,t)$ (not shown). Alternatively, a switch 1625 may be included to switch between the conditional distributions $f^{RTWP}(x,t)$ and $f^{other+N}(x,t)$.

The recursive thermal noise estimate $\hat{P}_{N\text{-}recursive}(t_1)$ may be output directly as the thermal noise estimate $\hat{P}_N(t_1)$. But in another embodiment, the noise estimator 1520 may include a noise floor rate limiter 1660 which limits the rate of the recursive thermal noise estimate $\hat{P}_{N\text{-}recursive}(t_1)$ to output the thermal noise estimate $\hat{P}_N(t_1)$. When the noise floor rate limiter 1660 is present, the noise estimator 1520 may be hardwired to provide the output of the noise floor rate limiter 1660 as the thermal noise estimate $\hat{P}_N(t_1)$ (not shown). Alternatively, a switch 1665 may be provided to switch between outputting the recursive thermal noise estimate $\hat{P}_{N\text{-}recursive}(t_1)$ from the noise floor estimator 1640 or outputting from the noise floor rate limiter 1660.

In yet another embodiment, the noise estimator 1520 may include a noise bias estimator 1650 and a multiplier 1655 (with or without the noise floor rate limiter 1660). The noise bias estimator 1650 may determine the bias in the recursive thermal noise estimate $\hat{P}_{N\text{-}recursive}(t_1)$ from the noise floor estimator 1640, and output a thermal noise bias factor k(t). The multiplier 1655 may then correct the bias by multiplying the recursive thermal noise estimate $\hat{P}_{N\text{-}recursive}(t_1)$ with the thermal noise bias factor k(t). The output of the multiplier 1655 may be output directly as the thermal noise estimate $\hat{P}_N(t_1)$ or rate limited by the noise floor rate limiter 1660 (if present).

When the noise bias estimator 1650 is present, the noise estimator 1520 may be hardwired to always determine the thermal noise bias factor k(t) to output the bias corrected thermal noise estimate $\hat{P}_N(t_1)$ (not shown). Alternatively, a switch 1645 may be provided. The switch 1645 should be "all or nothing". That is, if the switch is in connected state, the path from the noise floor estimator 1640 output to the noise bias estimator 1650 input and the path from the noise bias estimator 1650 output and the multiplier 1655 input are connected. Otherwise, they are both disconnected. In yet another alternative, the freedom to choose whether or not to output the bias corrected thermal noise estimate $\hat{P}_N(t_1)$ can still be provided even if the noise bias estimator 1650 is hardwired (i.e., switch 1645 not provided). When correction is not desired, the noise bias estimator 1650 may be set to output k(t)=1.

FIG. 17 illustrates an example of a generalized noise and interference predictor 1840 where there are M antenna branches 1805. FIG. 15 may be viewed as an instance of FIG. 17 where M=1. The generalized noise and interference predictor 1840 may comprise an other cell interference estimator 1710, M noise estimators 1720, a branch scale factor determiner 1730, and a plurality of multipliers and a summer.

In one aspect, each noise estimator 1720-m corresponding to the antenna branch 1805-m may be structured similar to the noise estimator 1520 as illustrated in FIG. 16. As seen, each noise estimator 1720-m determines the corresponding thermal noise estimate $\hat{P}_N^m(t_1)$ The noise and interference predictor 1840 includes a scale factor determiner 1730 that determines branch scale factors, where each branch scale factor $\gamma^m(t_0)$ corresponds to each antenna branch m. Each branch scale factor $\gamma^m(t)$ represents an error introduced by the analogue signal conditioning that occurs at the corresponding antenna branch m. The branch scale factors $\gamma^m(t_0)$ are used to multiply corresponding the total wideband powers $P_{RTWP}^m(t_0)$ Then proportional contributions of the scaled total wideband powers are summed to determine a normalized total wideband power $P_{RTWP}^{normalized}(t_0)$. For example, the normalized total wideband power may be determined through:

$$P_{RTWP}^{normalized}(t) = \frac{1}{M}\sum_{m=1}^{M} \gamma^m(t) P_{RTWP}^m(t). \tag{47}$$

In addition, a normalized thermal noise estimate $\hat{P}_N^{normalized}(t_1)$ may be determined by multiplying the thermal noise estimate $\hat{P}_N^{m_0}(t_1)$ of a particular antenna branch m=m$_0$ with the corresponding branch scale factor $\gamma^{m_0}(t_0)$. For example, m$_0$=1. The normalized thermal noise estimate $\hat{P}_N^{normalized}(t_1)$ may be subtracted from the interference-and-normalized-noise sum estimate $\hat{P}_{other}(t_1) + \hat{P}_N^{normalized}(t_1)$.

The other cell interference estimator 1710 may be structured similarly to the other cell interference estimator 1510 illustrated in FIG. 16. That is, the other cell interference estimator 1710 may output the estimates $\hat{P}_{other}(t_1)$, $\hat{p}_{load}(t_1)$, $\Delta\hat{L}_{own}(t_1)$ based on the known inputs, which in this instance are the scheduled load factor $L_{own}(t_0)$, the used load factor $\overline{L}_{own}(t_0)$, and a normalized total wideband power $P_{RTWP}^{normalized}(t_0)$.

FIG. 19 illustrates a flow chart of example method 1900 performed by a radio network node 410 to implement a high performing estimator. In particular, the method may be performed by the noise and interference predictor 1840.

As illustrated, in step 1910, the noise and interference predictor 1840 may receive a scheduled load factor $L_{own}(t_0)$, a used load factor $\overline{L}_{own}(t_0)$, and for each antenna branch m, m=1 ... M, a corresponding total wideband power $P_{RTWP}^m(t_0)$, all applicable at time t=t$_0$. In step 1920, the other cell interference estimator 1510, 1710 may determine a load utilization probability estimate $\hat{p}_{load}(t_1)$ and an other cell interference estimate $\hat{P}_{other}(t_1)$ both applicable at time t=t$_1$, based on the scheduled load factor $L_{own}(t_0)$, the used load factor $\overline{L}_{own}(t_0)$, and the M total wideband power(s) $P_{RTWP}^m(t_0)$, in which $t_1-t_0=T>0$. In step 1930, the noise estimator 1520, 1720 may determine, for each antenna branch m, a corresponding thermal noise estimate $\hat{P}_N^m(t_1)$ and a corresponding rise-over-thermal estimate $\hat{RoT}^m(t_1)$, both applicable at the time t=t$_1$, based on the corresponding total wideband power $P_{RTWP}^m(t_0)$.

FIG. 20 illustrates a flow chart of an example process to implement the step 1920. This flow chart is appropriate when there is only one antenna branch, i.e., M=1. In step 2010, the other cell interference estimator 1510 may determine the load utilization probability estimate $\hat{P}_{other}(t_1)$ and an interference-and-noise sum estimate $\hat{P}_{other}(t_1) + \hat{P}_N(t_1)$ based on the scheduled load factor $L_{own}(t_0)$, the used load factor $\overline{L}_{own}(t_0)$, and the total wideband power $P_{RTWP}(t_0)$ To implement the step 2010, the flow chart of FIG. 13 may be followed. In step 2020, the other cell interference estimator 1510 may determine the other cell interference estimate $\hat{P}_{other}(t_1)$ by subtracting the thermal noise estimate $\hat{P}_N(t_1)$ from the interference-and-noise sum estimate $\hat{P}_{other}(t_1) + \hat{P}_N(t_1)$ To implement the step 2010, the flow chart of FIG. 13 may be followed.

Figure 21:
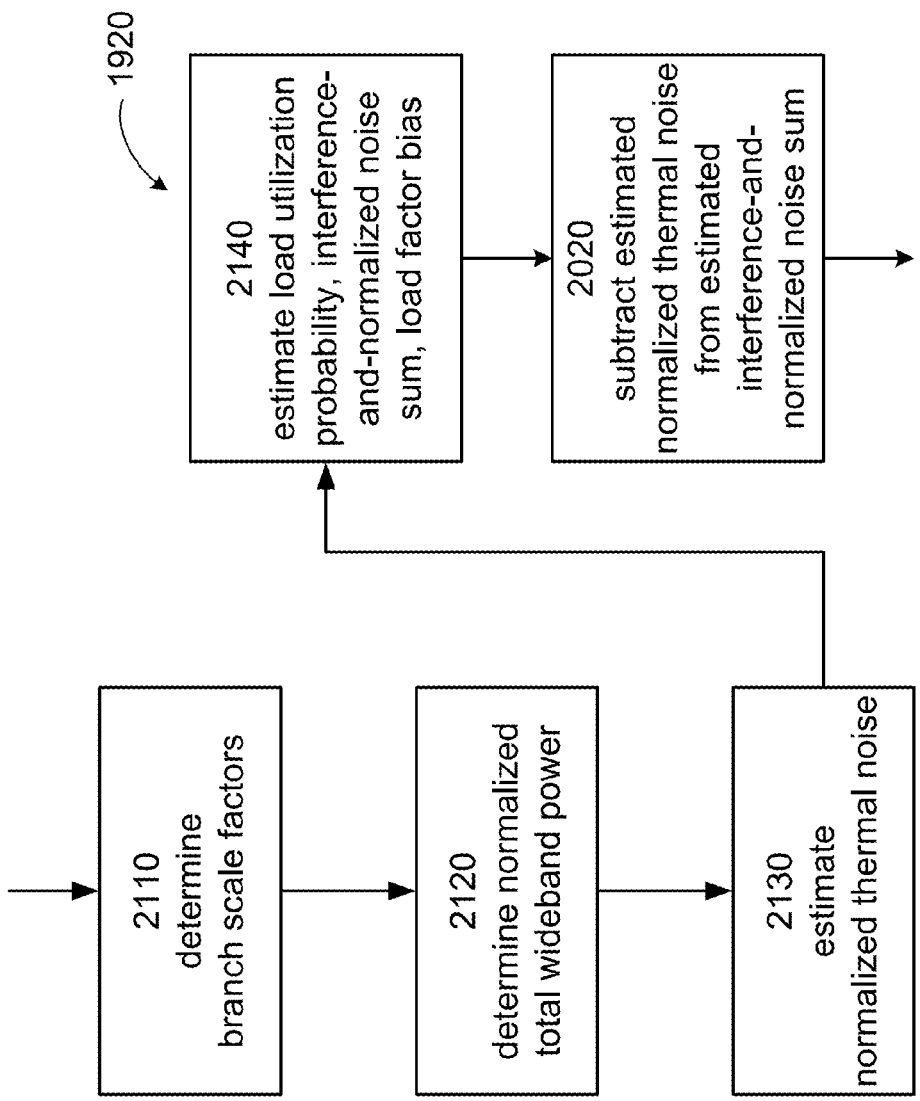
FIG. 21 illustrates a flow chart of an example process performed by the other cell interference estimator to estimate the load utilization probability and to estimate the interference-and-noise sum when there is are multiple antenna branches.

FIG. 21 illustrates a flow chart of another example process to implement the step 1920. This flow chart is appropriate when there are multiple antenna branches, i.e., M>1. In step 2110, the scale factor determiner 1730 may determine a plurality of branch scale factors $\gamma^m(t_0)$ based on the plurality of thermal noise estimates $\hat{P}_N^m(t_1)$, in which each branch scale factor $\gamma^m(t_0)$ corresponds to each antenna branch m. In step 2120, the other cell interference estimator 1710 may determine a normalized total wideband power $P_{RTWP}^{normalized}(t_0)$ based on the plurality of branch scale factors $\gamma^m(t_0)$ and the plurality of total wideband powers $P_{RTWP}^m(t_0)$. In step 2130, the normalized thermal noise estimate $\hat{P}_N^{normalized}(t_1)$ may be determined based at least on the branch scale factor $\gamma^{m_0}(t_0)$ and on the thermal noise estimate $\hat{P}_N^{m_0}(t_1)$ corresponding to the antenna branch m=m$_0$. Then in step 2140, the other cell interference estimator 1710 may determine the load utilization probability estimate $\hat{P}_{other}(t_1)$ and an interference-and-normalized-noise sum estimate $\hat{P}_{other}(t_1) + \hat{P}_N^{normalized}(t_1)$ based on the scheduled load factor $L_{own}(t_0)$, the used load factor $\overline{L}_{own}(t_0)$, and the normalized total wideband power $P_{RTWP}^{normalized}(t_0)$. To implement the step 2140, the flow chart of FIG. 13 may be followed. In step 2150, the other cell interference estimator 1710 may determine the other cell interference estimate $\hat{P}_{other}(t_1)$ by subtracting the normalized thermal noise estimate $\hat{P}_N^{normalized}(t_1)$ from the interference-and-normalized-noise sum estimate $\hat{P}_{other}(t_1)+\hat{P}_N^{normalized}(t_1)$.

A non-exhaustive list of advantages of the subject matter of the disclosed subject matter includes:

Providing other cell interference with a bandwidth corresponding to one half of a TTI (one half is due to Nyqvists celebrated theorem that a signal sampled with a certain rate can only represent the signal with a bandwidth corresponding to half that rate—or so called aliasing occurs). Conventional algorithms typically have bandwidths corresponding to the order of tens of Providing estimates that are significantly more accurate than conventional algorithms.

Providing an extended range to provide useful other cell interference estimates, up to a total interference level of about 15 dB mean RoT. Previous algorithms only provide useful accuracies where the other cell interference power is in a small band well below the 10 dB mean RoT interference level.

Another advantage is in providing estimates of load utilization probability and other cell interference that can enhance the performance of the scheduler and the overall HetNet interference management. This can lead to (among others):

Enhancing the performance of the whole mobile broadband cellular system.

Simplifying network interference management by providing other cell interference levels at central nodes in the radio access network (RAN) and core network (CN).

Enabling self organization network (SON) functionality in wireless networks (such as WCDMA). Such functionality can be dependent on knowledge of the interference situations in different cells.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by at least one processor of a radio network node associated with a cell of interest in a wireless network, the at least one processor operating as a noise and interference predictor, wherein the radio network node comprises a total of M antenna branch(es), M being a positive integer, the method comprising:

receiving a scheduled load factor $L_{own}(t_o)$ applicable at time $t=t_o$;

receiving a used load factor $\bar{L}_{own}(t_o)$ applicable at time the $t=t_o$;

receiving, for each antenna branch m, m=1 ... M, a corresponding total wideband power $P_{RTWP}^m(t_o)$ applicable at the time $t=t_o$;

determining, by the at least one processor, a load utilization probability estimate $\hat{p}_{load}(t_1)$ and an other cell interference estimate $\hat{P}_{other}(t_1)$, both applicable at time $t=t_1$, based on the scheduled load factor $L_{own}(t_o)$, the used load factor $\bar{L}_{own}(t_o)$, and the M total wideband power(s) $P_{RTWP}^m(t_o)$, wherein $t_1-t_o=T>0$;

for each antenna branch m, determining by the at least one processor a corresponding thermal noise estimate $\hat{P}_N^m(t_1)$ and a corresponding rise-over-thermal estimate $\hat{RoT}^m(t_1)$, both applicable at the time $t=t_1$, based on the corresponding total wideband power $P_{RTWP}^m(t_o)$, and making, by the at least one processor, a scheduling decision for network traffic based at least in part on at least one of the load utilization probability estimate $\hat{p}_{load}(t_1)$ and the other cell interference estimate $\hat{P}_{other}(t_1)$, the corresponding thermal noise estimate $\hat{P}_N^m(t_1)$ and the corresponding rise-over-thermal estimate, and wherein $L_{own}(t)$ represents resource grants scheduled for use at time t to one or more cell terminals in the cell of interest, $\bar{L}_{own}(t)$ represents resource grants used at time t by the same cell terminals, and each $P_{RTWP}^m(t)$ represents the total wideband power present at time t at the antenna branch m;

wherein $\hat{p}_{load}(t)$ represents an estimate of the load utilization probability $p_{load}(t)$ which expresses a probability of resources grants for use at time t actually being used at time t;

wherein $\hat{P}_{other}(t)$ represents an estimate of the other cell interference $P_{other}(t)$ which expresses a sum of interferences present in the cell of interest at time t due to wireless activities applicable in one or more cells other than in the cell of interest, wherein each $\hat{P}_N^m(t)$ represents an estimate of the corresponding thermal noise $\hat{P}_N^m(t)$ which expresses a sum of undesired signals present at time t at the antenna branch m excluding the other cell interference $P_{other}(t)$, and wherein each $RoT^m(t)$ represents an estimate of the corresponding rise-over-thermal $RoT^m(t)$ present at time t at the antenna branch m, the rise-over-thermal being defined as $$RoT^m(t) = \frac{P_{RTWP}^m(t)}{P_N^m(t)}.$$

2. The method of claim 1, wherein T is equal to a positive integer multiple of a transmission time interval (TTI).

3. The method of claim 1, wherein there is one antenna branch M=1 such that the total wideband power $P_{RTWP}^1(t_o)=P_{RTWP}(t_o)$, and the thermal noise estimate $\hat{P}_N^1(t_1)=\hat{P}_N(t_1)$, and wherein the step of determining the load utilization probability estimate $\hat{p}_{load}(t_1)$ and the other cell interference estimate $\hat{P}_{other}(t_1)$ comprises:

determining the load utilization probability estimate $\hat{P}_{other}(t_1)$ and an interference-and-noise sum estimate $\hat{P}_{other}(t_1)+\hat{P}_N(t_1)$ based on the scheduled load factor $L_{own}(t_o)$, the used load factor $\bar{L}_{own}(t_o)$, and the total wideband power $P_{RTWP}(t_o)$; and determining the other cell interference estimate $\hat{P}_{other}(t_1)$ by subtracting the thermal noise estimate $\hat{P}_N(t_1)$ from the interference-and-noise sum estimate $\hat{P}_{other}(t_1)+\hat{P}_N(t_1)$.

4. The method of claim 3, wherein the step of determining the load utilization probability estimate $\hat{P}_{other}(t_1)$ and the interference-and-noise sum estimate $\hat{P}_{other}(t_1)+\hat{P}_N(t_1)$ comprises:

modeling the load utilization probability $p_{load}(t)$ and the interference-and-noise sum $P_{other}(t)+P_N(t)$ as first and second states $x_1(t)=p_{load}(t)$, $x_2(t)=P_{other}(t)+P_N(t)$ in a state vector $x(t)$ of a state space model;

modeling a measured total wideband power $y_{RTWP}(t)$ and a measured load utilization $y_{loadUtilization}(t)$ in an output measurement vector $y(t)$ of the state space model;

obtaining a predicted state vector $\hat{x}(t_1|t_o)$ which includes therein first and second predicted states $\hat{x}_1(t_1|t_o)$, $\hat{x}_2(t_1|t_o)$ whose values are based on the load utilization probability estimate $\hat{p}_{load}(t_o)$ and the interference-and-noise sum estimate $\hat{P}_{other}(t_o)+\hat{P}_N(t_o)$;

updating the predicted state vector $\hat{x}(t_1|t_o)$ based on one or more measurements included in an output measurement vector $y(t_1)$ applicable at the time $t=t_1$ to obtain an estimated state vector $\hat{x}(t_1|t_1)=\hat{x}(t_1)$; and obtaining first and second estimated states $\hat{x}_1(t_1)$, $\hat{x}_2(t_1)$ from the estimated state vector $\hat{x}(t_1)$ respectively as the load utilization probability estimate $\hat{x}_1(t_1)=\hat{p}_{load}(t_1)$ and the interference-and-noise sum estimate $\hat{x}_2(t_1)=\hat{P}_{other}(t_1)+\hat{P}_N(t_1)$, wherein modeling errors and measurement errors are incorporated in the state space model as a model error vector $w(t)$ and a measurement error vector $e(t)$, wherein the predicted state vector $\hat{x}(t|t-T)$ denotes a prediction of the state vector $x(t)$ based on information available up to time $t-T$, and wherein the estimated state vector $\hat{x}(t|t)=\hat{x}(t)$ denotes an estimate of the state vector $x(t)$ based on information available up to time $t$.

5. The method of claim 4, further comprising:

projecting the estimated state vector $\hat{x}(t_1)$ based at least on dynamic modes corresponding to the cell of interest to obtain a predicted state vector $\hat{x}(t_2|t_1)$, $t_2-t_1=T$; and modeling third and fourth states $x_3(t)=\Delta\bar{L}_{own}(t)$, $x_4(t)=x_1(t-T)$ in the state vector $x(t)$ of the state space model, the third state $x_3(t)=\Delta\bar{L}_{own}(t)$ being a load factor bias expressing an error of a scheduled load factor $L_{own}(t)$, and the fourth state $x_4(t)=x_1(t-T)$ reflecting that the load utilization probability measurement is subject to a delay corresponding to the sampling period T, wherein the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-noise sum estimate $\hat{x}_2(t_1)=\hat{P}_{other}(t_1)+\hat{P}_N(t_1)$, wherein the state space model is characterized through equations $x(t+T)=A(t)x(t)+B(t)u(t)+w(t)$ and $y(t)=c(x(t))+e(t)$, in which $x(t)$ represents the state vector, $u(t)$ represents an input vector, $y(t)$ represents the output measurement vector, $w(t)$ represents the model error vector, $e(t)$ represents the measurement error vector, $A(t)$ represents a system matrix describing dynamic modes of the system, $B(t)$ represents an input gain matrix, $c(x(t))$ represents a measurement vector which is a function of the states of the system, $t$ represents time and $T$ represents a sampling period, wherein the step of updating the predicted state vector $\hat{x}(t_1|t_o)$ comprises:

modeling the measured total wideband power $y_{RTWP}(t_1)$ applicable at the time $t=t_1$ as $$y_{RTWP}(t_1) = \frac{x_2(t_1)}{1-L_{own}(t_1-T_D)x_1(t_1)+x_3(t_1)} + e_{RTWP}(t_1),$$

$T_D$ representing a delay between calculation of the schedule and a time the schedule takes effect on an air interface;

modeling the load utilization $y_{loadUtilization}(t_1)$ applicable at the time $t=t_1$ as $y_{loadUtilization}(t_1)=\hat{x}_4(t_1)+e_{loadUtilization}(t_1)$;

obtaining a measurement matrix $K_f(t_1)$ around the predicted state vector $\hat{x}(t_1|t_o)$, the predicted state vector $\hat{x}(t_1|t_o)$ including first, second, third, and fourth predicted states $\hat{x}_1(t_1|t_o)$, $\hat{x}_2(t_1|t_o)$, $\hat{x}_3(t_1|t_o)$, $\hat{x}_4(t_1|t_o)$ predicted based on data upto the time $t=t_o$, obtaining a Kalman gain matrix $K_f(t_1)$ based on at least the measurement matrix $C(t_1)$, the measurement error vector $e(t_1)$, and a predicted covariance matrix $P(t_1|t_o)$ corresponding to the predicted state vector $\hat{x}(t_1|t_o)$; and updating the predicted state vector $\hat{x}(t_1|t_o)$ based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$, the estimated state vector $\hat{x}(t_1)$ including the first, second, third, and fourth estimated states $\hat{x}_1(t_1)$, $\hat{x}_2(t_1)$, $\hat{x}_3(t_1)$, $\hat{x}_4(t_1)$ and updating the predicted covariance matrix $P(t_1|t_o)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

6. The method of claim 5, wherein the step of projecting the estimated state vector $\hat{x}(t_1)$ comprises projecting the estimated state vector $\hat{x}(t_1)$ based on at least the system matrix $A(t_1)$ to obtain the predicted state vector $\hat{x}(t_2|t_1)$ which includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$, and wherein the method further comprises projecting the updated covariance matrix $P(t_1|t_1)$ to obtain a predicted covariance matrix $P(t_2|t_1)$ based on at least the system matrix $A(t_1)$ and a system noise covariance matrix $R_1(t_1)$.

7. The method of claim 1, wherein $M>1$, and wherein the step of determining the load utilization probability estimate $\hat{p}_{load}(t_1)$ and the other cell interference estimate $\hat{P}_{other}(t_1)$ comprises:

determining a plurality of branch scale factors $\gamma^m(t_o)$ based on the plurality of thermal noise estimates $\hat{P}_N^m(t_1)$, each branch scale factor $\gamma^m(t_o)$ corresponding to each antenna branch $m$;

determining a normalized total wideband power $P_{RTWP}^{normalized}(t_o)$ based on the plurality of branch scale factors $\gamma^m(t_o)$ and the plurality of total wideband powers $P_{RTWP}^m(t_o)$;

determining a normalized thermal noise estimate $\hat{P}_{RTWP}^{normalized}(t_1)$ based at least on the branch scale factor $\gamma^{m_o}(t_o)$ and on the thermal noise estimate $\hat{P}_N^{m_o}(t_1)$ corresponding to the antenna branch $m=m_o$;

determining the load utilization probability estimate $\hat{P}_{other}(t_1)$ and an interference-and-normalized-noise sum estimate $\hat{P}_{other}(t_1)+\hat{P}_N^{normalized}(t_1)$ based on the scheduled load factor $L_{own}(t_o)$, the used load factor $\bar{L}_{own}(t_o)$, and the normalized total wideband power $P_{RTWP}^{normalized}(t_o)$; and determining the other cell interference estimate $\hat{P}_{other}(t_1)$ by subtracting the normalized thermal noise estimate $\hat{P}_N^{normalized}(t_1)$) from the interference-and-normalized-noise sum estimate $\hat{P}_{other}(t_1)+\hat{P}_N^{normalized}(t_1)$, wherein each branch scale factor $\gamma^m(t)$ represents an error introduced by analogue signal conditioning that occurs for the corresponding antenna branch m, and wherein the normalized total wideband power $P_{RTWP}^{normalized}(t)$ represents a sum of scaled contribution of each antenna branch m to a total received wideband power measured at the radio network node applicable at time t.

8. The method of claim 7, wherein the normalized total wideband power is defined as $$P_{RTWP}^{normalized}(t) = \frac{1}{M}\sum_{m=1}^{M} \gamma^m(t) P_{RTWP}^m(t).$$

9. The method of claim 7, wherein the step of determining the load utilization probability estimate $\hat{P}_{other}(t_1)$ and the interference-and-noise sum estimate $\hat{P}_{other}(t_1)+\hat{P}_N^{normalized}(t_1)$ comprises:

modeling the load utilization probability $p_{load}(t)$ and the interference-and-normalized-noise sum $\hat{P}_{other}(t_1)+\hat{P}_N^{normalized}(t_1)$ as first and second states $x_1(t) p_{load}(t), x_2(t)=P_{other}(t)+P_N^{normalized}(t)$ in a state vector $x(t)$ of a state space model;

modeling the normalized total wideband power $\hat{P}_{RTWP}^{normalized}(t)$ and a measured load utilization $y_{loadUtilization}(t)$ in an output measurement vector $y(t)$ of the state space model;

obtaining a predicted state vector $\hat{x}(t_1|t_o)$ which includes therein first and second predicted states $\hat{x}_1(t_1|t_o), \hat{x}_2(t_1|t_o)$ whose values are based on the load utilization probability estimate $\hat{p}load(t_o)$ and the interference-and-normalized-noise sum estimate $\hat{P}other(t_o)+\hat{P}_N^{normalized}(t_o)$;

updating the predicted state vector $\hat{x}(t_1|t_o)$ based on one or more measurements included in an output measurement vector $y(t_1)$ applicable at the time $t=t_1$ to obtain an estimated state vector $\hat{x}(t_1|t_1)=\hat{x}(t_1)$; and obtaining first and second estimated states $\hat{x}_1(t_1), \hat{x}_2(t_1)$ from the estimated state vector $\hat{x}(t_1)$ respectively as the load utilization probability estimate $\hat{x}_1(t_1)=\hat{p}_{load}(t_1)$ and the interference-and-normalized-noise sum estimate $\hat{x}_2(t)=\hat{P}_{other}(t_1)\hat{P}_N^{normalized}(t_1)$, wherein modeling errors and measurement errors are incorporated in the state space model as a model error vector $w(t)$ and a measurement error vector $e(t)$, wherein the predicted state vector $\hat{x}(t|t-T)$ denotes a prediction of the state vector $x(t)$ based on information available up to time $t-T$, and wherein the estimated state vector $\hat{x}(t|t)=\hat{x}(t)$ denotes an estimate of the state vector $x(t)$ based on information available up to time $t$.

10. The method of claim 9, further comprising:

projecting the estimated state vector $\hat{x}(t_1)$ based at least on dynamic modes corresponding to the cell of interest to obtain a predicted state vector $\hat{x}(t_2|t_1), t_2-t_1=T$; and modeling third and fourth states $x_3(t)=\Delta \bar{L}_{own}(t), x_4(t)=(t-T)$ in the state vector $x(t)$ of the state space model, the third state $x_3(t)=\Delta \bar{L}_{own}(t)$ being a load factor bias expressing an error of a scheduled load factor $L_{own}(t)$, and the fourth state $x_4(t)=x_1(t-T)$ reflecting that the load utilization probability measurement is subject to a delay corresponding to the sampling period T, wherein the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-normalized-noise sum estimate $\hat{x}_2(t)=\hat{P}_{other}(t_1)+\hat{P}_N^{normalized}(t_1)$, wherein the state space model is characterized through equations $x(t+T)=A(t)x(t)+B(t)u(t)+w(t)$ and $y(t)=c(x(t))+e(t)$, in which $x(t)$ represents the state vector, $u(t)$ represents an input vector, $y(t)$ represents the output measurement vector, $w(t)$ represents the model error vector, $e(t)$ represents the measurement error vector, $A(t)$ represents a system matrix describing dynamic modes of the system, $B(t)$ represents an input gain matrix, $c(x(t))$ represents a measurement vector which is a function of the states of the system, t represents time and T represents a sampling period, wherein the step of updating the predicted state vector $\hat{x}(t_1|t_o)$ comprises:

modeling the normalized total wideband power $P_{RTWP}^{normalized}(t_1)$ applicable at the time $t=t_1$ as $$P_{RTWP}^{normalized}(t_1) = \frac{x_2(t_1)}{1 - L_{own}(t_1 - T_D)x_1(t_1) + x_3(t_1)} + e_{RTWP}(t_1),$$

$T_D$ representing a delay between calculation of the schedule and a time the schedule takes effect on an air interface;

modeling the load utilization $y_{loadUtilization}(t_1)$ applicable at the time $t=t_1$ as $y_{loadUtilization}(t_1)=x_4(t_1)+e_{loadUtilization}(t_1)$;

obtaining ( ) a measurement matrix $C(t_1)$ around the predicted state vector $\hat{x}(t_1|t_o)$, the predicted state vector $\hat{x}(t_1|t_o)$ including first, second, third, and fourth predicted states $\hat{x}_1(t_1|t_o), \hat{x}_2(t_1|t_o), \hat{x}_3(t_1|t_o), \hat{x}_4(t_1|t_o)$ predicted based on data upto the time $t=t_o$;

obtaining a Kalman gain matrix $K_f(t_1)$ based on at least the measurement matrix $C(t_1)$, the measurement error vector $e(t_1)$, and a predicted covariance matrix $P(t_1|t_o)$ corresponding to the predicted state vector $\hat{x}_1(t_1|t_o)$; and updating the predicted state vector $\hat{x}_1(t_1|t_o)$ based on at least the Kalman gain matrix $K_f(t_1)$, the output measurement vector $y(t_1)$, and the measurement vector $c(x(t_1))$ to obtain the estimated state vector $\hat{x}(t_1|t_o)=\hat{x}(t_1)$, the estimated state vector $\hat{x}(t_1)$ including the first, second, third, and fourth estimated states $\hat{x}_1(t_1), \hat{x}_2(t_1), \hat{x}_3(t_1), \hat{x}_4(t_1)$; and updating the predicted covariance matrix $P(t_1|t_o)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

11. The method of claim 10, wherein the step of projecting the estimated state vector $\hat{x}(t_1)$ comprises projecting the estimated state vector $\hat{x}(t_1)$ based on at least the system matrix $A(t_1)$ to obtain the predicted state vector $\hat{x}(t_2|t_1)$ which includes the first, second, third, and fourth predicted states $\hat{x}_1(t_2|t_1), \hat{x}_2(t_2|t_1), \hat{x}_3(t_2|t_1)) \hat{x}_4(t_2|t_1)$, and wherein the method further comprises projecting the updated covariance matrix $P(t_1|t_1)$ to obtain a predicted covariance matrix $P(t_2|t_1)$ based on at least the system matrix $A(t_1)$ and a system noise covariance matrix $R_1(t_1)$.

12. A radio network node associated with a cell of interest in a wireless network, the radio network node comprising:

M antenna branch(es), M being a positive integer;

a power meter structured to determine for each antenna branch m, m=1 ... M, a total wideband power $P_{RTWP}^m(t_0)$ all applicable at time the $t=t_0$; and at least one processor operable to:

determine a scheduled load factor $L_{own}(t_0)$ applicable at time $t=t_0$;

determine a used load factor $\overline{L}_{own}(t_0)$ applicable at time the $t=t_0$;

determine a load utilization probability estimate $\hat{P}_{load}(t_1)$ and an other cell estimate $\hat{P}_{other}(t_1)$, both applicable at time $t=t_1$, based on the scheduled load factor $L_{own}(t_0)$, the used load factor $\overline{L}_{own}(t_0)$, and the M total wideband power(s) $P_{RTWP}^m(t_0)$, wherein $t_1-t_0=T>0$; and for each of the respective M antenna branch(es), determine a corresponding thermal noise estimate $\hat{P}_N^m(t_1)$ and a corresponding rise-over-thermal estimate $RoT^m(t_1)$, both applicable at the time $t=t_1$, based on the corresponding total wideband power $P_{RTWP}^m(t_0)$, make a scheduling decision for network traffic based at least in part on at least one of the load utilization probability estimate $\hat{p}_{load}(t_1)$ and the other cell interference estimate $\hat{P}_{other}(t_1)$, the corresponding thermal noise estimate $\hat{P}_N^m(t_1)$ and the corresponding rise-over-thermal estimate, and wherein $L_{own}(t)$ represents resource grants scheduled for use at time t to one or more cell terminals in the cell of interest, $\overline{L}_{own}(t)$ represents resource grants used at time t by the same cell terminals, and each $P_{RTWP}^m(t)$ represents the total wideband power present at time t at the antenna branch m;

wherein $\hat{p}_{load}(t)$ represents an estimate of the load utilization probability $p_{load}(t)$ which expresses a probability of resources grants for use at time t actually being used at time t;

wherein $\hat{P}_{other}(t)$ represents an estimate of the other cell interference $P_{other}(t)$ which expresses a sum of interferences present in the cell of interest at time t due to wireless activities applicable in one or more cells other than in the cell of interest, wherein each $\hat{P}_N^m(t)$ represents an estimate of the corresponding thermal noise $\hat{P}_N^m(t)$ which expresses a sum of undesired signals present at time t at the antenna branch m excluding the other cell interference $P_{other}(t)$, and wherein each $\hat{RoT}^m(t)$ represents an estimate of the corresponding rise-over-thermal $RoT^m(t)$ present at time t at the antenna branch m, the rise-over-thermal being defined as $$RoT^m(t) = \frac{P_{RTWP}^m(t)}{P_N^m(t)}.$$

13. The radio network node of claim 12, wherein T is equal to a positive integer multiple of a transmission time interval (TTI).

14. The radio network node of claim 12, wherein there is one antenna branch $M=m_0=1$ such that the total wideband power $P_{RTWP}^1(t_0)=P_{RTWP}(t_o)$, and the thermal noise estimate $\hat{P}_N^1(t_1)=\hat{P}_N(t_1)$ and wherein the other cell interference estimator is structured to determine the load utilization probability estimate $\hat{P}_{other}(t_1)$ and an interference-and-noise sum estimate $\hat{P}_{other}(t_1)+\hat{P}_N(t_1)$ based on the scheduled load factor $L_{own}(t_0)$, the used load factor $\overline{L}_{own}(t_0)$, and the total wideband power $P_{RTWP}(t_0)$, and determine the other cell interference estimate $\hat{P}_{other}(t_1)$ by subtracting the thermal noise estimate $\hat{P}_N(t_1)$ from the interference-and-noise sum estimate $\hat{P}_{other}(t_1)+\hat{P}_N(t_1)$.

15. The radio network node of claim 14, wherein the other cell interference estimator is structured to:

model the load utilization probability $P_{load}(t)$ and the interference-and-noise sum $P_{other}(t)+P_N(t)$ as first and second states $x_1(t)=P_{load}(t)$, $x_2(t)=P_{other}(t)+P_N(t)$ in a state vector $x(t)$ of a state space model, model a measured total wideband power $y_{RTWP}(t)$ and a measured load utilization $y_{loadUtilization}(t)$ in an output measurement vector $y(t)$ of the state space model, obtain a predicted state vector $\hat{x}(t_1|t_0)$ which includes therein first and second predicted states $\hat{x}(t_1|t_0)$, $\hat{x}_2(t_1|t_0)$ whose values are based on the load utilization probability estimate $\hat{P}_{load}(t_0)$ and the interference-and-noise sum estimate $\hat{P}_{other}(t_0)+\hat{P}_N(t_0)$, update the predicted state vector $\hat{x}(t_1|t_0)$ based on one or more measurements included in an output measurement vector $y(t_1)$ applicable at the time $t=t_1$ to obtain an estimated state vector $\hat{x}(t_1|t_1)=\hat{x}(t_1)$, and obtain first and second estimated states $\hat{x}_1(t_1)$, $\hat{x}_2(t_1)$ from the estimated state vector $\hat{x}(t_1)$ respectively as the load utilization probability estimate $\hat{x}_1(t_1)=\hat{P}_{load}(t_1)$ and the interference-and-noise sum estimate $\hat{x}_2(t_1)=\hat{P}_{other}(t_1)+\hat{P}_N(t_1)$, wherein modeling errors and measurement errors are incorporated in the state space model as a model error vector $w(t)$ and a measurement error vector $e(t)$, wherein the predicted state vector $\hat{x}(t|t-T)$ denotes a prediction of the state vector $x(t)$ based on information available up to time $t-T$, and wherein estimated state vector $\hat{x}(t|t)=1(t)$ denotes an estimate of the state vector $x(t)$ based on information available up to time t.

16. The radio network node of claim 15, wherein the other cell interference estimator is structured to:

project the estimated state vector $\hat{x}(t_1)$ based at least on dynamic modes corresponding to the cell of interest to obtain a predicted state vector $\hat{x}(t_2|t_1)$, $t_2-t_1=T$, model third and fourth states $x_3(t)=\Delta \overline{L}_{own}(t)$, $x_4(t)=x_1(t-T)$ in the state vector $x(t)$ of the state space model, the third state $x_3(t)=\Delta \overline{L}_{own}(t)$ being a load factor bias expressing an error of a scheduled load factor $L_{own}(t)$, and the fourth state $x_4(t)=x_1(t-T)$ reflecting that the load utilization probability measurement is subject to a delay corresponding to the sampling period T, wherein the predicted state vector $\hat{x}(t_2|t_1)$ includes first and second predicted states) $\hat{x}_1(t_2|t_1)$ and $\hat{x}_2(t_2|t_1)$ whose values are based on the load utilization probability estimate $\hat{P}_{load}(t_1)$ and the interference-and-noise sum estimate $\hat{x}_2(t_1)=\hat{P}_{other}(t_1)+\hat{P}_N(t_1)$, wherein the state space model is characterized through equations $x(t+T)=A(t)x(t)+B(t)u(t)+w(t)$ and $y(t)=c(x(t))+e(t)$, in which $x(t)$ represents the state vector, $u(t)$ represents an input vector, $y(t)$ represents the output measurement vector, $w(t)$ represents the model error vector, $e(t)$ represents the measurement error vector, $A(t)$ represents a system matrix describing dynamic modes of the system, $B(t)$ represents an input gain matrix, $c(x(t))$ represents a measurement vector which is a function of the states of the system, t represents time and T represents a sampling period, wherein the other cell interference estimator updates the predicted state vector $\hat{x}(t_1|t_0)$ through modeling the measured total wideband power $y_{RTWP}(t_1)$ applicable at the time $t=t_1$ as $$y_{RTWP}(t_1) = \frac{x_1(t_1)}{1 - L_{own}(t_1 - T_D)x_1(t_1) + x_3(t_1)} + e_{RTWP}(t_1),$$

$T_D$ representing a delay between calculation of the schedule and a time the schedule takes effect on an air interface, modeling the load utilization $y_{loadUtilization}(t_1)$ applicable at the time $t=t_i$ as $y_{loadUtilization}(t_1)=x_4(t_1) e_{loadUtilization}(t_1)$;

obtaining ( ) a measurement matrix $C(t_1)$ around the predicted state vector $\hat{x}(t_1|t_0)$, the predicted state vector $\hat{x}(t_1|t_0)$ including first, second, third, and fourth predicted states $\hat{x}_1(t_1|t_0)$, $\hat{x}_2(t_1|t_0)$, $x_3(t_1|t_0)$, $x_4(t_1|t_0)$ predicted based on data upto the time $t=t_0$, obtaining a Kalman gain matrix $K_f(t_1)$ based on at least the measurement matrix $C(t_1)$, the measurement error vector $e(t_1)$, and a predicted covariance matrix $P(t_1|t_0)$ corresponding to the predicted state vector $\hat{x}(t_1|t_0)$, updating the predicted state vector $\hat{x}(t_1|t_0)$ based on at least the Kalman gain matrix $K_f(t_1)$, the output measurement vector $y(t_1)$, and the measurement vector $c(x(t_1))$ to obtain the estimated state vector $\hat{x}(t_1|t_0)=\hat{x}(t_1)$, the estimated state vector $\hat{x}(t_1)$ including the first, second, third, and fourth estimated states $\hat{x}_1(t_1)$, $\hat{x}_2(t_1)$, $\hat{x}_3(t_1)$, $\hat{x}_4(t_1)$, and updating the predicted covariance matrix $P(t_1|t_0)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

17. The radio network node of claim 16, wherein the other cell interference estimator is structured to project the estimated state vector $\hat{x}(t_1)$ through projecting the estimated state vector $\hat{x}(t_1)$ based on at least the system matrix $A(t_1)$ to obtain the predicted state vector $\hat{x}(t_2|t_1)$ which includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$, and projecting the updated covariance matrix $P(t_1|t_1)$ to obtain a predicted covariance matrix $P(t_2|t_1)$ based on at least the system matrix $A(t_1)$ and a system noise covariance matrix $R_1(t_1)$.

18. The radio network node of claim 12, wherein M>1, and wherein the other cell interference estimator is structured to determine the load utilization probability estimate $\hat{P}_{load}(t_1)$ and the other cell interference estimate $\hat{P}_{other}(t_1)$ through determining a plurality of branch scale factors $\gamma^m(t_0)$ based on the plurality of thermal noise estimates $\hat{P}_n^m(t_1)$, each branch scale factor $\gamma^m(t_0)$ corresponding to each antenna branch m, determining a normalized total wideband power $P_N^{normalized}(t_0)$ based on the plurality of branch scale factors $\gamma^m(t_0)$ and the plurality of total wideband powers $P_{RTWP}^m(t_0)$, determining a normalized thermal noise estimate $\hat{P}_N^{normalized}(t_1)$ based at least on the branch scale factor $\gamma^{m_o}(t_0)$ and on the thermal noise estimate $\hat{P}_N^{m_o}(t_1)$ corresponding to the antenna branch $m=m_o$, determining the load utilization probability estimate $\hat{P}_{other}(t_1)$ and an interference-and-normalized-noise sum estimate $\hat{P}_{other}(t_1)+\hat{P}_N^{normalized}(t_1)$ based on the scheduled load factor $L_{own}(t_0)$ the used load factor $\overline{L}_{own}(t_0)$, and the normalized total wideband power $P_{RTWP}^{normalized}(t_0)$, and determining the other cell interference estimate $\hat{P}_{other}(t_1)$ by subtracting the normalized thermal noise estimate $\hat{P}_N^{normalized}(t_1)$ from the interference-and-normalized-noise sum estimate $\hat{P}_{other}(t_1)+\hat{P}_N^{normalized}(t_1)$, wherein each branch scale factor $\gamma^m(t)$ represents an error introduced by analogue signal conditioning that occurs for the corresponding antenna branch m, and wherein the normalized total wideband power $P_{RTWP}^{normalized}(t)$ represents a sum of scaled contribution of each antenna branch m to a total received wideband power measured at the radio network node applicable at time t.

19. The radio network node of claim 18, wherein the normalized total wideband power is defined as $$P_{RTWP}^{normalized}(t) = \frac{1}{M} -= \sum_{m=1}^{M} \gamma^m(t) P_{RTWP}^m(t).$$

20. The radio network node of claim 18, wherein the other cell interference estimator is structured to determine the load utilization probability estimate $\hat{P}_{other}(t_1)$ and the interference-and-noise sum estimate $\hat{P}_{other}(t_1)+\hat{P}_N^{normalized}(t_1)$ through modeling the load utilization probability $P_{load}(t)$ and the interference-and-normalized-noise sum $P_{other}(t_1)+P_N^{normalized}(t_1)$ as first and second states $x_1(t)=p_{load}(t)$, $x_2(t)=P_{other}(t)+P_N^{normalized}(t_1)$ in a state vector $x(t)$ of a state space model, modeling the normalized total wideband power $P_{RTWP}^{normalized}(t)$ and a measured load utilization $y_{loadutilization}(t)$ in an output measurement vector $y(t)$ of the state space model, obtaining a predicted state vector $\hat{x}(t_1|t_0)$ which includes therein first and second predicted states $\hat{x}_1(t_1|t_0)$, $\hat{x}_2(t_1|t_0)$ whose values are based on the load utilization probability estimate $\hat{p}_{load}(t_0)$ and the interference-and-normalized-noise sum estimate $\hat{P}_{other}(t_0)+\hat{P}_N^{normalized}(t_0)$ updating the predicted state vector $\hat{x}(t_1|t_0)$ based on one or more measurements included in an output measurement vector $y(t_1)$ applicable at the time $t=t_1$ to obtain an estimated state vector, $\hat{x}(t_1|t_1)=\hat{x}(t_1)$, and obtaining first and second estimated states $\hat{x}_1(t_1)$, $\hat{x}_2(t_1)$ from the estimated state vector $\hat{x}(t_1)$ respectively as the load utilization probability estimate $\hat{x}_1(t_1)=\hat{p}_{load}(t_1)$ and the interference-and-normalized-noise sum estimate $\hat{x}_2(t)=\hat{P}_{other}(t_1)+\hat{P}_N^{normalized}(t_1)$, wherein modeling errors and measurement errors are incorporated in the state space model as a model error vector $w(t)$ and a measurement error vector $e(t)$, wherein the predicted state vector $\hat{x}(t|t-T)$ denotes a prediction of the state vector $x(t)$ based on information available up to time $t-T$, and wherein the estimated state vector $\hat{x}(t|t=\hat{x}(t)$ denotes an estimate of the state vector $x(t)$ based on information available up to time t.

21. The radio network node of claim 20, wherein the other cell interference estimator is structured to project the estimated state vector $\hat{x}(t_1)$ based at least on dynamic modes corresponding to the cell of interest to obtain a predicted state vector $\hat{x}(t_2|t_1)$, $t_2-t_1=T$, and model third and fourth states $x_3(t)=\Delta\overline{L}_{own}(t)$, $x_4(t)=x_1(t-T)$ in the state vector $x(t)$ of the state space model, the third state $x_3(t)=\Delta\overline{L}_{own}(t)$ being a load factor bias expressing an error of a scheduled load factor $\overline{L}_{own}(t)$, and the fourth state $x_4(t)=x_1(t-T)$ reflecting that the load utilization probability measurement is subject to a delay corresponding to the sampling period T, wherein the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-normalized-noise sum estimate $\hat{x}_2=\hat{P}_{other}(t_1)+\hat{P}_N^{normalized}(t_1)$, wherein the state space model is characterized through equations $x(t+T)=A(t)x(t)+B(t)u(t)+w(t)$ and $y(t)=c(x(t))+e(t)$, in which $x(t)$ represents the state vector, $u(t)$ represents an input vector, $y(t)$ represents the output measurement vector, $w(t)$ represents the model error vector, $e(t)$ represents the measurement error vector, $A(t)$ represents a system matrix describing dynamic modes of the system, $B(t)$ represents an input gain matrix, $c(x(t))$ represents a measurement vector which is a function of the states of the system, t represents time and T represents a sampling period, wherein the other cell interference estimator is structured to update the predicted state vector $\hat{x}(t_1|t_0)$ through modeling the normalized total wideband power $P_{RTWP}^{normalized}(t_1)$ applicable at the time $t=t_1$ as $$P_{RTWP}^{normalized}(t_1) = \frac{x_2(t_1)}{1-L_{own}(t_1-T_D)x_1(t_1)+x_3(t_1)} + e_{RTWP}(t_1),$$

$T_D$ representing a delay between calculation of the schedule and a time the schedule takes effect on an air interface, modeling the load utilization $y_{loadUtilization}(t_1)$ applicable at the time $t=t_1$ as $y_{loadUtilization}(t_1)=x_4(t_1)+e_{loadUtilization}(t_1)$, obtaining a measurement matrix $C(t_1)$ around the predicted state vector $\hat{x}(t_1|t_o)$, the predicted state vector $\hat{x}(t_1|t_0)$ including first, second, third, and fourth predicted states $\hat{x}_1(t_1|t_0)$, $\hat{x}_2(t_1|t_0)$, $\hat{x}_3(t_1|t_0)$, $\hat{x}_4(t_1|t_0)$ predicted based on data up to the time $t=t_0$, obtaining a Kalman gain matrix $K_f(t_1)$ based on at least the measurement matrix $C(t_1)$, the measurement error vector $e(t_1)$, and a predicted covariance matrix $P(t_1|t_0)$ corresponding to the predicted state vector $\hat{x}(t_1|t_0)$, updating the predicted state vector $\hat{x}(t_1|t_0)$ based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$, the estimated state vector $\hat{x}(t_1)$ including the first, second, third, and fourth estimated states $\hat{x}_1(t_1)$, $\hat{x}_2(t_1)$, $\hat{x}_3(t_1)$, $\hat{x}_4(t_1)$, and updating the predicted covariance matrix $P(t_1|t_0)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

22. The radio network node of claim 21, wherein the other cell interference estimator is structured to project the estimated state vector $\hat{x}(t_1)$ through projecting the estimated state vector $R(t_1)$ based on at least the system matrix $A(t_1)$ to obtain the predicted state vector $\hat{x}(t_2|t_1)$ which includes the first, second, third, and fourth predicted states $\hat{x}_1(t_2|t_1)$, $\hat{x}_2(t_2|t_1)$, $x_3(t_2|t_1)$, $\hat{x}_4(t_2|t_1)$, and project the updated covariance matrix $P(t_1|t_1)$ to obtain a predicted covariance matrix $P(t_2|t_1)$ based on at least the system matrix $A(t_1)$ and a system noise covariance matrix $R_1(t_1)$.

23. A non-transitory computer readable medium which has stored therein programming instructions operable when executed to cause the computer to:

receive a scheduled load factor $L_{own}(t_0)$ applicable at time $t=t_0$;

receive a used load factor $\overline{L}_{own}(t_0)$ applicable at time the $t=t_0$;

receive, for each antenna branch m of a total of M antenna branch(es), m=1 ... M, a corresponding total wideband power $P_{RTWP}^m(t_0)$ applicable at the time $t=t_0$, wherein M is a positive integer;

determine a load utilization probability estimate $\hat{p}_{load}(t_1)$ and another cell interference estimate $\hat{P}_{other}(t_1)$, both applicable at time $t=t_1$, based on the scheduled load factor $L_{own}(t_0)$, the used load factor $\overline{L}_{own}(t_0)$, and the M total wideband power(s) $P_{RTWP}^m(t_0)$, wherein $t_1-t_0=T>0$; and determine, for each antenna branch m, a corresponding thermal noise estimate $\hat{P}_N^m(t_1)$ and a corresponding rise-over-thermal estimate, $\hat{RoT}^m(t_1)$, both applicable at the time $t=t_1$ based on the corresponding total wideband power $P_{RTWP}^m(t_0)$, make a scheduling decision for network traffic based at least in part on at least one of the load utilization probability estimate $\hat{p}_{load}(t_1)$ and the other cell interference estimate $\hat{P}_{other}(t_1)$, the corresponding thermal noise estimate $\hat{P}_N^m(t_1)$ and the corresponding rise-over-thermal estimate, and wherein $L_{own}(t)$ represents resource grants scheduled for use at time t to one or more cell terminals in the cell of interest, $\overline{L}_{own}(t)$ represents resource grants used at time t by the same cell terminals, and each $P_{RTWP}^m(t$, represents the total wideband power present at time t at the antenna branch m;

wherein $\hat{P}_{load}(t)$ represents an estimate of the load utilization probability $P_{load}(t_1)$ which expresses a probability of resources grants for use at time t actually being used at time t;

wherein $\hat{P}_{other}(t)$ represents an estimate of the other cell interference $P_{other}(t)$ which expresses a sum of interferences present in the cell of interest at time t due to wireless activities applicable in one or more cells other than in the cell of interest, wherein each $\hat{P}_N^m(t)$, represents an estimate of the corresponding thermal noise $P_N^m(t)$ which expresses a sum of undesired signals present at time t at the antenna branch m excluding the other cell interference $P_{other}(t)$, and wherein each $\hat{RoT}^m(t)$ represents an estimate of the corresponding rise-over-thermal $RoT^m(t)$ present at time t at the antenna branch m, the rise-over-thermal being defined as $$RoT^m(t) = \frac{P_{RTWP}^m(t)}{P_N^m(t)}.$$

* * * * *